US011098576B2

(12) United States Patent
Cerrahoglu et al.

(10) Patent No.: US 11,098,576 B2
(45) Date of Patent: Aug. 24, 2021

(54) INFLOW DETECTION USING DTS FEATURES

(71) Applicant: Lytt Limited, Middlesex (GB)

(72) Inventors: Cagri Cerrahoglu, Middlesex (GB); James Crofton Ramsay, Middlesex (GB); Pradyumna Thiruvenkatanathan, London (GB)

(73) Assignee: LYTT LIMITED, Middlesex (GB)

( * ) Notice: Subject to any disclaimer, the term of this patent is extended or adjusted under 35 U.S.C. 154(b) by 0 days.

(21) Appl. No.: 17/071,031

(22) Filed: Oct. 15, 2020

(65) Prior Publication Data

US 2021/0115785 A1    Apr. 22, 2021

(51) Int. Cl.
| E21B 47/103 | (2012.01) |
| E21B 47/135 | (2012.01) |
| E21B 47/113 | (2012.01) |
| E21B 47/10 | (2012.01) |
| E21B 47/12 | (2012.01) |
| E21B 47/00 | (2012.01) |
| E21B 47/14 | (2006.01) |
| E21B 47/08 | (2012.01) |
| G01K 11/32 | (2021.01) |

(Continued)

(52) U.S. Cl.
CPC .......... *E21B 47/103* (2020.05); *E21B 47/135* (2020.05); *E21B 47/00* (2013.01); *E21B 47/06* (2013.01); *E21B 47/08* (2013.01); *E21B 47/10* (2013.01); *E21B 47/113* (2020.05); *E21B 47/12* (2013.01); *E21B 47/14* (2013.01); *E21B 2200/20* (2020.05); *E21B 2200/22* (2020.05); *G01F 23/00* (2013.01); *G01K 11/32* (2013.01)

(58) Field of Classification Search
CPC ...... E21B 47/103; E21B 47/135; E21B 47/06; E21B 47/12; E21B 47/10; E21B 47/00; E21B 47/113; E21B 2200/20
See application file for complete search history.

(56) References Cited

U.S. PATENT DOCUMENTS

| 3,563,311 A | 2/1971 | Stein |
| 3,841,144 A | 10/1974 | Baldwin |
| 3,854,323 A | 12/1974 | Hearn et al. |

(Continued)

FOREIGN PATENT DOCUMENTS

| CA | 2760662 A1 | 12/2010 |
| CA | 2953938 A1 | 1/2016 |

(Continued)

OTHER PUBLICATIONS

PCT/EP2019/078195 International Search Report and Written Opinion dated Jul. 9, 2020 (13 p.).

(Continued)

*Primary Examiner* — Tara Schimpf
*Assistant Examiner* — Manuel C Portocarrero
(74) *Attorney, Agent, or Firm* — Conley Rose, P.C.

(57) ABSTRACT

A method of determining fluid inflow locations comprises determining a plurality of temperature features from a distributed temperature sensing signal originating in a wellbore, using the plurality of temperature features in a fluid inflow identification model, and determining the presence of fluid inflow at one or more locations along the wellbore based on an output from the fluid inflow identification model.

24 Claims, 6 Drawing Sheets

(51) Int. Cl.
*E21B 47/06* (2012.01)
*G01F 23/00* (2006.01)

(56) References Cited

U.S. PATENT DOCUMENTS

| | | | |
|---|---|---|---|
| 5,014,249 A | 5/1991 | Brink |
| 5,042,297 A | 8/1991 | Lessi |
| 5,113,941 A | 5/1992 | Donovan |
| 5,257,530 A | 11/1993 | Beattie et al. |
| 5,812,493 A | 9/1998 | Robein et al. |
| 5,825,017 A | 10/1998 | Pryor |
| 5,971,095 A | 10/1999 | Ozbek |
| 6,075,611 A | 6/2000 | Dussan, V. et al. |
| 6,151,556 A | 11/2000 | Allen |
| 6,201,765 B1 | 3/2001 | Ireson |
| 6,450,037 B1 | 9/2002 | McGuinn et al. |
| 6,501,067 B2 | 12/2002 | Jones et al. |
| 6,516,275 B2 | 2/2003 | Lazaratos |
| 6,550,342 B2 | 4/2003 | Croteau et al. |
| 6,555,807 B2 | 4/2003 | Clayton et al. |
| 6,587,798 B2 | 7/2003 | Kersey et al. |
| 6,601,458 B1 | 8/2003 | Gysling et al. |
| 6,601,671 B1 | 8/2003 | Zhao et al. |
| 6,651,007 B2 | 11/2003 | Ozbek |
| 6,672,131 B1 | 1/2004 | Aldal et al. |
| 6,738,715 B2 | 5/2004 | Shatilo et al. |
| 6,751,559 B2 | 6/2004 | Fookes et al. |
| 6,782,150 B2 | 8/2004 | Davis et al. |
| 6,813,403 B2 | 11/2004 | Tennyson |
| 6,829,538 B2 | 12/2004 | de Kok |
| 6,837,098 B2 | 1/2005 | Gysling et al. |
| 6,904,368 B2 | 6/2005 | Reshef et al. |
| 6,933,491 B2 | 8/2005 | Maida, Jr. |
| 7,028,543 B2 | 4/2006 | Hardage et al. |
| 7,030,971 B1 | 4/2006 | Payton |
| 7,072,044 B2 | 7/2006 | Kringlebotn et al. |
| 7,088,639 B2 | 8/2006 | Walls et al. |
| 7,130,496 B2 | 10/2006 | Rogers |
| 7,219,762 B2 | 5/2007 | James et al. |
| 7,355,923 B2 | 4/2008 | Reshef et al. |
| 7,357,021 B2 | 4/2008 | Blacklaw |
| 7,395,864 B2 | 7/2008 | Ramachandran et al. |
| 7,398,697 B2 | 7/2008 | Allen et al. |
| 7,404,456 B2 | 7/2008 | Weaver et al. |
| 7,503,217 B2 | 3/2009 | Johansen |
| 7,652,245 B2 | 1/2010 | Crickmore et al. |
| 7,659,828 B2 | 2/2010 | Wehrs et al. |
| 7,660,200 B2 | 2/2010 | Tang |
| 7,872,736 B2 | 1/2011 | Rogers et al. |
| 7,890,280 B2 | 2/2011 | Fomme |
| 7,896,069 B2 | 3/2011 | Dria et al. |
| 7,940,389 B2 | 5/2011 | Rogers et al. |
| 7,946,341 B2 | 5/2011 | Hartog et al. |
| 8,020,616 B2 | 9/2011 | Greenaway |
| 8,023,829 B2 | 9/2011 | Nash et al. |
| 8,131,121 B2 | 3/2012 | Huffman |
| 8,200,049 B2 | 6/2012 | Kaplan et al. |
| 8,245,780 B2 | 8/2012 | Fidan et al. |
| 8,248,589 B2 | 8/2012 | DeFreitas et al. |
| 8,264,676 B2 | 9/2012 | Kanellopoulos et al. |
| 8,408,064 B2 | 4/2013 | Hartog et al. |
| 8,520,197 B2 | 8/2013 | Handerek |
| 8,534,114 B2 | 9/2013 | Ellson |
| 8,564,786 B2 | 10/2013 | Crickmore et al. |
| 8,576,386 B2 | 11/2013 | Jones et al. |
| 8,605,542 B2 | 12/2013 | Coates et al. |
| 8,614,795 B2 | 12/2013 | Duncan et al. |
| 8,634,681 B2 | 1/2014 | Rogers |
| 8,661,907 B2 | 3/2014 | Davis et al. |
| 8,755,643 B2 | 6/2014 | Nash et al. |
| 8,797,824 B2 | 8/2014 | Crickmore et al. |
| 8,902,704 B2 | 12/2014 | Zamow et al. |
| 8,923,663 B2 | 12/2014 | Hill et al. |
| 8,941,821 B2 | 1/2015 | Coupe et al. |
| 8,950,482 B2 | 2/2015 | Hill et al. |
| 8,973,444 B2 | 3/2015 | Hill et al. |
| 8,996,298 B2 | 3/2015 | Yamada |
| 8,997,585 B2 | 4/2015 | Hayward |
| 9,002,149 B2 | 4/2015 | Rogers |
| 9,052,230 B2 | 6/2015 | Kutlik et al. |
| 9,075,155 B2 | 7/2015 | Luscombe et al. |
| 9,109,944 B2 | 8/2015 | Den Boer et al. |
| 9,110,018 B2 | 8/2015 | Handerek |
| 9,140,582 B2 | 9/2015 | Farhadiroushan et al. |
| 9,140,815 B2 | 9/2015 | Lopez et al. |
| 9,146,151 B2 | 9/2015 | Kupershmidt |
| 9,228,889 B2 | 1/2016 | McCann |
| 9,243,949 B2 | 1/2016 | Crickmore et al. |
| 9,250,112 B2 | 2/2016 | Godfrey |
| 9,250,120 B2 | 2/2016 | Smith et al. |
| 9,255,836 B2 | 2/2016 | Taverner et al. |
| 9,304,017 B2 | 4/2016 | Handerek |
| 9,341,731 B2 | 5/2016 | Biswas |
| 9,347,313 B2 | 5/2016 | Wills et al. |
| 9,354,338 B1 | 5/2016 | Psaila |
| 9,377,551 B2 | 6/2016 | Hartog et al. |
| 9,377,559 B2 | 6/2016 | Cooper |
| 9,388,685 B2 | 7/2016 | Ravi et al. |
| 9,416,644 B2 | 8/2016 | McEwen-King et al. |
| 9,423,523 B2 | 8/2016 | McEwen-King |
| 9,429,466 B2 | 8/2016 | Barfoot et al. |
| 9,430,507 B2 | 8/2016 | Stowe et al. |
| 9,435,668 B2 | 9/2016 | Lewis et al. |
| 9,435,902 B2 | 9/2016 | Hill et al. |
| 9,453,821 B2 | 9/2016 | Minto et al. |
| 9,459,329 B2 | 10/2016 | McEwen-King et al. |
| 9,465,126 B2 | 10/2016 | Lewis et al. |
| 9,478,937 B1 | 10/2016 | Kupershmidt et al. |
| 9,507,030 B2 | 11/2016 | Godfrey |
| 9,512,711 B2 | 12/2016 | Sobolewski et al. |
| 9,523,790 B1 | 12/2016 | Valishin |
| 9,541,425 B2 | 1/2017 | Farhadiroushan et al. |
| 9,557,195 B2 | 1/2017 | Barfoot et al. |
| 9,561,812 B2 | 2/2017 | Godfrey |
| 9,575,196 B2 | 2/2017 | Ji et al. |
| 9,594,002 B2 | 3/2017 | Godfrey et al. |
| 9,599,489 B2 | 3/2017 | Nash et al. |
| 9,605,537 B2 | 3/2017 | Hull et al. |
| 9,606,250 B2 | 3/2017 | Hull et al. |
| 9,625,348 B2 | 4/2017 | Hill et al. |
| 9,631,972 B2 | 4/2017 | Hill et al. |
| 9,651,474 B2 | 5/2017 | Farhadiroushan et al. |
| 9,651,709 B2 | 5/2017 | Jaaskelainen |
| 9,677,956 B2 | 6/2017 | Hill et al. |
| 9,702,244 B2 | 7/2017 | Willis et al. |
| 9,719,846 B2 | 8/2017 | Ellmauthaler et al. |
| 9,733,120 B2 | 8/2017 | Stokely et al. |
| 9,739,645 B2 | 8/2017 | Hill et al. |
| 9,746,393 B2 | 8/2017 | Godfrey |
| 9,759,824 B2 | 9/2017 | Lumens et al. |
| 9,766,371 B2 | 9/2017 | Barfoot et al. |
| 9,778,097 B2 | 10/2017 | McEwen-King |
| 9,784,642 B2 | 10/2017 | Strong et al. |
| 9,797,239 B2 | 10/2017 | Godfrey |
| 9,810,809 B2 | 11/2017 | Farhadiroushan et al. |
| 9,816,853 B2 | 11/2017 | Crickmore et al. |
| 9,823,114 B2 | 11/2017 | Farhadiroushan et al. |
| 9,829,368 B2 | 11/2017 | Kutlik et al. |
| 9,850,749 B2 | 12/2017 | Finfer et al. |
| 9,869,795 B2 | 1/2018 | Jaaskelainen |
| 9,880,047 B2 | 1/2018 | Martin et al. |
| 9,896,929 B2 | 2/2018 | Farhadiroushan et al. |
| 9,909,903 B2 | 3/2018 | Lewis et al. |
| 9,945,215 B2 | 4/2018 | Godfrey |
| 9,945,979 B2 | 4/2018 | Stokely et al. |
| 9,983,293 B2 | 5/2018 | Farhadiroushan et al. |
| 9,989,388 B2 | 6/2018 | Farhadiroushan et al. |
| 10,018,036 B2 | 7/2018 | Ellmauthaler et al. |
| 10,031,044 B2 | 7/2018 | Kumar et al. |
| 10,067,030 B2 | 9/2018 | Hartog et al. |
| 10,101,182 B2 | 10/2018 | Barfoot |
| 10,120,104 B2 | 11/2018 | Roy et al. |
| 10,139,268 B2 | 11/2018 | Nunes et al. |
| 10,145,821 B2 | 12/2018 | Farhadiroushan et al. |

(56) References Cited

U.S. PATENT DOCUMENTS

| | | |
|---|---|---|
| 10,151,626 B2 | 12/2018 | Godfrey et al. |
| 10,175,374 B2 | 1/2019 | Dusterhoft et al. |
| 10,180,515 B2 | 1/2019 | Ellmauthaler et al. |
| 10,197,693 B2 | 2/2019 | Kalyanraman et al. |
| 10,198,946 B2 | 2/2019 | Crickmore et al. |
| 10,215,017 B2 | 2/2019 | Hull et al. |
| 10,221,681 B2 | 3/2019 | McEwen-King et al. |
| 10,234,345 B2 | 3/2019 | Hull et al. |
| 10,247,584 B2 | 4/2019 | Crickmore et al. |
| 10,260,937 B2 | 4/2019 | Dankers et al. |
| 10,267,141 B2 | 4/2019 | Nunes et al. |
| 10,274,381 B2 | 4/2019 | Kulkarni et al. |
| 10,275,402 B2 | 4/2019 | Guerriero et al. |
| 10,281,341 B2 | 5/2019 | Hull et al. |
| 10,310,113 B2 | 6/2019 | Sun et al. |
| 10,317,262 B2 | 6/2019 | Kippersund et al. |
| 10,379,239 B2 | 8/2019 | Udengaard |
| 10,393,921 B2 | 8/2019 | Cuny et al. |
| 10,401,519 B2 | 9/2019 | Willis et al. |
| 10,416,328 B2 | 9/2019 | Walters et al. |
| 10,422,365 B2 | 9/2019 | Hull et al. |
| 10,422,901 B2 | 9/2019 | Walters et al. |
| 10,429,530 B2 | 10/2019 | Rickett et al. |
| 10,444,388 B2 | 10/2019 | Dusterhoft et al. |
| 10,444,391 B2 | 10/2019 | Ellmauthaler et al. |
| 10,444,393 B2 | 10/2019 | Cheng et al. |
| 10,458,224 B2 | 10/2019 | Dickenson et al. |
| 10,520,625 B2 | 12/2019 | Walters et al. |
| 10,578,757 B2 | 3/2020 | Dong et al. |
| 2001/0037883 A1 | 11/2001 | Veneruso et al. |
| 2002/0125009 A1 | 9/2002 | Wetzel et al. |
| 2002/0139929 A1 | 10/2002 | Mullins et al. |
| 2002/0195246 A1 | 12/2002 | Davidson |
| 2003/0010126 A1 | 1/2003 | Romanet et al. |
| 2003/0014199 A1 | 1/2003 | Toomey |
| 2003/0029241 A1 | 2/2003 | Mandal |
| 2004/0059505 A1 | 3/2004 | Gallagher |
| 2004/0252748 A1 | 12/2004 | Gleitman |
| 2005/0100172 A1 | 5/2005 | Schliep et al. |
| 2005/0246111 A1 | 11/2005 | Gysling et al. |
| 2006/0113089 A1 | 6/2006 | Henriksen et al. |
| 2006/0165239 A1 | 7/2006 | Langner et al. |
| 2006/0165344 A1 | 7/2006 | Mendez et al. |
| 2007/0047867 A1 | 3/2007 | Goldner |
| 2007/0163780 A1 | 7/2007 | Onodera et al. |
| 2007/0199696 A1 | 8/2007 | Walford |
| 2007/0215345 A1 | 9/2007 | Lafferty et al. |
| 2007/0234789 A1 | 10/2007 | Glasbergen et al. |
| 2007/0247631 A1 | 10/2007 | Paulson |
| 2007/0253561 A1 | 11/2007 | Williams et al. |
| 2008/0137475 A1 | 6/2008 | Maisons |
| 2008/0154510 A1 | 6/2008 | Scott |
| 2008/0232748 A1 | 9/2008 | Nash |
| 2008/0314142 A1 | 12/2008 | Davies |
| 2009/0010104 A1 | 1/2009 | Leaney |
| 2009/0055098 A1 | 2/2009 | Mese et al. |
| 2009/0132183 A1 | 5/2009 | Hartog et al. |
| 2009/0202192 A1 | 8/2009 | Taverner et al. |
| 2009/0213692 A1 | 8/2009 | Martinez et al. |
| 2010/0163223 A1 | 7/2010 | Brown |
| 2010/0243241 A1 | 9/2010 | Hampton et al. |
| 2010/0258304 A1 | 10/2010 | Hegeman |
| 2010/0268489 A1 | 10/2010 | Lie et al. |
| 2011/0030467 A1 | 2/2011 | Bakulin |
| 2011/0042071 A1 | 2/2011 | Hsu et al. |
| 2011/0085415 A1 | 4/2011 | Morton et al. |
| 2011/0110191 A1 | 5/2011 | Williams-Stroud et al. |
| 2011/0139538 A1 | 6/2011 | Hill et al. |
| 2011/0149688 A1 | 6/2011 | Hill et al. |
| 2011/0188346 A1 | 8/2011 | Hull |
| 2011/0255077 A1 | 10/2011 | Rogers |
| 2011/0301882 A1 | 12/2011 | Andersen |
| 2011/0315369 A1 | 12/2011 | Holderman et al. |
| 2012/0020184 A1 | 1/2012 | Wilson et al. |
| 2012/0043079 A1 | 2/2012 | Wassouf et al. |
| 2012/0057432 A1 | 3/2012 | Hill et al. |
| 2012/0092960 A1 | 4/2012 | Gaston et al. |
| 2012/0096922 A1 | 4/2012 | Ellson |
| 2012/0111560 A1 | 5/2012 | Hill et al. |
| 2012/0137781 A1 | 6/2012 | Hill et al. |
| 2012/0152024 A1 | 6/2012 | Johansen |
| 2012/0155218 A1 | 6/2012 | Beasley et al. |
| 2012/0257475 A1 | 10/2012 | Luscombe et al. |
| 2012/0290213 A1 | 11/2012 | Huo et al. |
| 2013/0139600 A1 | 6/2013 | McEwen-King et al. |
| 2013/0151203 A1 | 6/2013 | McEwen-King et al. |
| 2013/0166227 A1 | 6/2013 | Hermann et al. |
| 2013/0167628 A1 | 7/2013 | Hull et al. |
| 2013/0170519 A1 | 7/2013 | Alliot |
| 2013/0298665 A1 | 11/2013 | Minchau |
| 2013/0299165 A1 | 11/2013 | Crow |
| 2013/0319121 A1 | 12/2013 | Hill et al. |
| 2014/0025319 A1 | 1/2014 | Farhadiroushan et al. |
| 2014/0036627 A1 | 2/2014 | Hull et al. |
| 2014/0036628 A1 | 2/2014 | Hill et al. |
| 2014/0069173 A1 | 3/2014 | Roy et al. |
| 2014/0086009 A1 | 3/2014 | Yoneshima |
| 2014/0150523 A1 | 6/2014 | Stokely et al. |
| 2014/0150548 A1 | 6/2014 | Childers et al. |
| 2014/0204368 A1 | 7/2014 | Lewis et al. |
| 2014/0216151 A1 | 8/2014 | Godfrey et al. |
| 2014/0334253 A1 | 11/2014 | Lumens et al. |
| 2014/0362668 A1 | 12/2014 | McEwen-King |
| 2015/0000415 A1 | 1/2015 | Kelley |
| 2015/0085610 A1 | 3/2015 | Raum et al. |
| 2015/0144333 A1 | 5/2015 | Lee et al. |
| 2015/0146759 A1 | 5/2015 | Johnston |
| 2015/0234526 A1 | 8/2015 | Chalubert et al. |
| 2015/0235544 A1 | 8/2015 | Hernandez et al. |
| 2015/0308191 A1* | 10/2015 | Zhan ............... G06F 17/18 703/2 |
| 2015/0308909 A1 | 10/2015 | Carneal et al. |
| 2016/0123798 A1 | 5/2016 | Godfrey et al. |
| 2016/0138386 A1 | 5/2016 | Stokely et al. |
| 2016/0146962 A1 | 5/2016 | Hayward |
| 2016/0223389 A1 | 8/2016 | Farhadiroushan et al. |
| 2016/0259079 A1 | 9/2016 | Wilson et al. |
| 2016/0265345 A1 | 9/2016 | In T Panhuis et al. |
| 2016/0281494 A1 | 9/2016 | Shirdel et al. |
| 2016/0312552 A1 | 10/2016 | Early et al. |
| 2016/0312604 A1 | 10/2016 | Hull et al. |
| 2016/0327419 A1 | 11/2016 | Hellevang et al. |
| 2016/0342569 A1 | 11/2016 | Al Marzouqi |
| 2016/0356665 A1 | 12/2016 | Felemban et al. |
| 2016/0369590 A1 | 12/2016 | Tonkin et al. |
| 2016/0369607 A1 | 12/2016 | Roy et al. |
| 2017/0010385 A1 | 1/2017 | Englich et al. |
| 2017/0016312 A1 | 1/2017 | Clarke et al. |
| 2017/0039826 A1 | 2/2017 | Cojocaur |
| 2017/0045410 A1 | 2/2017 | Crickmore et al. |
| 2017/0052049 A1 | 2/2017 | Crickmore et al. |
| 2017/0052050 A1 | 2/2017 | Crickmore et al. |
| 2017/0074998 A1 | 3/2017 | McColpin et al. |
| 2017/0074999 A1 | 3/2017 | Walters et al. |
| 2017/0075001 A1 | 3/2017 | McColpin et al. |
| 2017/0075002 A1 | 3/2017 | Ranjan et al. |
| 2017/0075003 A1 | 3/2017 | Dusterhoft et al. |
| 2017/0075004 A1 | 3/2017 | McColpin et al. |
| 2017/0075005 A1 | 3/2017 | Ranjan et al. |
| 2017/0082766 A1 | 3/2017 | Milne et al. |
| 2017/0119255 A1 | 5/2017 | Mahajan et al. |
| 2017/0123089 A1 | 5/2017 | Walters et al. |
| 2017/0153154 A1 | 6/2017 | Hull et al. |
| 2017/0205253 A1 | 7/2017 | Handerek |
| 2017/0241830 A1 | 8/2017 | Jaaskelainen |
| 2017/0241831 A1 | 8/2017 | Jaaskelainen |
| 2017/0275986 A1 | 9/2017 | Nunes et al. |
| 2017/0292862 A1 | 10/2017 | Godfrey |
| 2017/0315261 A1 | 11/2017 | Bartling et al. |
| 2017/0342814 A1 | 11/2017 | Krueger et al. |
| 2017/0343389 A1 | 11/2017 | Parker et al. |
| 2017/0350234 A1 | 12/2017 | Xia et al. |
| 2017/0363756 A1 | 12/2017 | El Allouche et al. |
| 2017/0371057 A1 | 12/2017 | Mateeva et al. |

(56) References Cited

U.S. PATENT DOCUMENTS

| | | |
|---|---|---|
| 2018/0024260 A1 | 1/2018 | Hornman et al. |
| 2018/0031413 A1 | 2/2018 | Stokely et al. |
| 2018/0045543 A1 | 2/2018 | Farhadiroushan et al. |
| 2018/0045768 A1 | 2/2018 | Godfrey et al. |
| 2018/0058196 A1 | 3/2018 | Jaaskelainen et al. |
| 2018/0066490 A1 | 3/2018 | Kjos |
| 2018/0087372 A1 | 3/2018 | Stokely et al. |
| 2018/0094952 A1 | 4/2018 | Handerek |
| 2018/0112519 A1 | 4/2018 | Duan et al. |
| 2018/0112520 A1 | 4/2018 | Duan |
| 2018/0112523 A1 | 4/2018 | Yang et al. |
| 2018/0136354 A1 | 5/2018 | Haldorsen |
| 2018/0172860 A1 | 6/2018 | Wilson et al. |
| 2018/0180658 A1 | 6/2018 | Godfrey |
| 2018/0203144 A1 | 7/2018 | Karrenbach et al. |
| 2018/0222498 A1 | 8/2018 | Kelley |
| 2018/0224572 A1 | 8/2018 | Farhadiroushan et al. |
| 2018/0230797 A1 | 8/2018 | Seshadri et al. |
| 2018/0231658 A1 | 8/2018 | Jalilian et al. |
| 2018/0238167 A1 | 8/2018 | Ravi et al. |
| 2018/0252097 A1 | 9/2018 | Skinner et al. |
| 2018/0259662 A1 | 9/2018 | Srinivasan |
| 2018/0266854 A1 | 9/2018 | Moore et al. |
| 2018/0267201 A1 | 9/2018 | Lewis |
| 2018/0284752 A1 | 10/2018 | Cella et al. |
| 2018/0292569 A1 | 10/2018 | LeBlanc et al. |
| 2018/0320827 A1 | 11/2018 | Hull et al. |
| 2018/0340801 A1 | 11/2018 | Kelley et al. |
| 2018/0342156 A1 | 11/2018 | Martin et al. |
| 2018/0354534 A1 | 12/2018 | Cole |
| 2018/0356210 A1 | 12/2018 | Moore et al. |
| 2019/0003499 A1 | 1/2019 | Logan et al. |
| 2019/0003903 A1 | 1/2019 | Godfrey |
| 2019/0025094 A1 | 1/2019 | Lewis et al. |
| 2019/0026634 A1 | 1/2019 | Homeyer et al. |
| 2019/0064030 A1 | 2/2019 | Sundermann |
| 2019/0072379 A1 | 3/2019 | Jalilian et al. |
| 2019/0113641 A1 | 4/2019 | Fang et al. |
| 2019/0120044 A1 | 4/2019 | Langnes et al. |
| 2019/0137045 A1 | 5/2019 | Jalilian et al. |
| 2019/0169985 A1 | 6/2019 | Dickenson et al. |
| 2019/0186958 A1 | 6/2019 | Godfrey |
| 2019/0197846 A1 | 6/2019 | Englund |
| 2019/0225250 A1 | 7/2019 | Esprey et al. |
| 2019/0257169 A1 | 8/2019 | Grimsbo et al. |
| 2019/0257699 A1 | 8/2019 | Handerek et al. |
| 2019/0323863 A1 | 10/2019 | Shatalin et al. |
| 2019/0324444 A1 | 10/2019 | Cella et al. |
| 2019/0331819 A1 | 10/2019 | Wu et al. |
| 2019/0339688 A1 | 11/2019 | Cella et al. |
| 2019/0353814 A1 | 11/2019 | Cha et al. |
| 2019/0390546 A1 | 12/2019 | Langnes et al. |
| 2020/0018149 A1 | 1/2020 | Luo et al. |
| 2020/0024942 A1 | 1/2020 | Lolla et al. |
| 2020/0032639 A1 | 1/2020 | Langnes et al. |
| 2020/0032645 A1 | 1/2020 | LeBlanc et al. |
| 2020/0048999 A1 | 2/2020 | Langnes et al. |
| 2020/0056907 A1 | 2/2020 | Godfrey |
| 2020/0057220 A1 | 2/2020 | Hull et al. |
| 2020/0070862 A1 | 3/2020 | Bilodeau et al. |
| 2020/0081145 A1 | 3/2020 | Padhi et al. |
| 2020/0088022 A1 | 3/2020 | Shen et al. |
| 2020/0102821 A1 | 4/2020 | Willis et al. |
| 2020/0124489 A1 | 4/2020 | Godfrey |
| 2020/0131900 A1 | 4/2020 | Leblanc et al. |
| 2020/0158594 A1 | 5/2020 | Dankers et al. |
| 2020/0172130 A1 | 6/2020 | Esprey |
| 2020/0173273 A1 | 6/2020 | Thiruvenkatanathan |
| 2020/0173818 A1 | 6/2020 | Handerek et al. |
| 2020/0174149 A1 | 6/2020 | Thiruvenkatanathan |
| 2020/0182047 A1 | 6/2020 | Langnes et al. |
| 2020/0184556 A1 | 6/2020 | Cella |
| 2020/0190971 A1 | 6/2020 | Thiruvenkatanathan |
| 2020/0200000 A1 | 6/2020 | Langnes et al. |
| 2020/0200943 A1 | 6/2020 | Adeyemi et al. |
| 2020/0233107 A1 | 7/2020 | Constantinou et al. |
| 2020/0256834 A1 | 8/2020 | Langnes et al. |
| 2020/0291772 A1 | 9/2020 | Thiruvenkatanathan et al. |
| 2021/0047916 A1 | 2/2021 | Thiruvenkatanathan et al. |

FOREIGN PATENT DOCUMENTS

| | | |
|---|---|---|
| CA | 2866274 A1 | 3/2016 |
| CN | 101769442 A | 7/2010 |
| CN | 102226390 A | 10/2011 |
| CN | 203561437 U | 4/2014 |
| CN | 105135219 A | 12/2015 |
| CN | 105676267 A | 6/2016 |
| CN | 205746047 U | 11/2016 |
| CN | 108918405 A | 11/2018 |
| CN | 109000157 A | 12/2018 |
| CN | 110231409 A | 9/2019 |
| CN | 209858753 U | 12/2019 |
| EP | 2418466 A2 | 2/2012 |
| EP | 3006908 A1 | 4/2016 |
| EP | 3032441 A2 | 6/2016 |
| EP | 3073051 A1 | 9/2016 |
| EP | 3440314 A2 | 2/2019 |
| EP | 3314308 B1 | 4/2019 |
| GB | 1299843 A | 12/1972 |
| GB | 2354782 A | 4/2001 |
| GB | 2359834 A | 9/2001 |
| GB | 2522061 A | 7/2015 |
| GB | 2555550 A | 5/2018 |
| GB | 2555637 A | 5/2018 |
| JP | 5518424 B2 | 6/2014 |
| NL | 9000577 A | 10/1990 |
| WO | 9721116 A1 | 6/1997 |
| WO | 2004031738 A1 | 4/2004 |
| WO | 2007024763 A2 | 3/2007 |
| WO | 2008147953 A1 | 12/2008 |
| WO | 2009048340 A2 | 4/2009 |
| WO | 2009086279 A2 | 7/2009 |
| WO | 2009109747 A1 | 9/2009 |
| WO | 2010/099484 A2 | 9/2010 |
| WO | 2010099484 A2 | 9/2010 |
| WO | 2012011831 A1 | 1/2012 |
| WO | 2013114135 A2 | 8/2013 |
| WO | 2015011394 A1 | 1/2015 |
| WO | 2015025216 A2 | 2/2015 |
| WO | 2015060981 A1 | 4/2015 |
| WO | 2015/170113 A1 | 11/2015 |
| WO | 2015170113 A1 | 11/2015 |
| WO | 2015170116 A1 | 11/2015 |
| WO | 2016010550 A1 | 1/2016 |
| WO | 2016020654 A1 | 2/2016 |
| WO | 2016115030 A1 | 7/2016 |
| WO | 2016207341 A1 | 12/2016 |
| WO | 2017009606 A1 | 1/2017 |
| WO | 2017064472 A1 | 4/2017 |
| WO | 2017078536 A1 | 5/2017 |
| WO | 2017109467 A1 | 6/2017 |
| WO | 2017156339 A1 | 9/2017 |
| WO | 2017203271 A1 | 11/2017 |
| WO | 2017214729 A1 | 12/2017 |
| WO | 2018044309 A1 | 3/2018 |
| WO | 2018057029 A1 | 3/2018 |
| WO | 2018088994 A1 | 5/2018 |
| WO | 2018136050 A1 | 7/2018 |
| WO | 2018154275 A1 | 8/2018 |
| WO | 2018195661 A1 | 11/2018 |
| WO | 2019005050 A1 | 1/2019 |
| WO | 2019027466 A1 | 2/2019 |
| WO | 2019072899 A2 | 4/2019 |
| WO | 2019094140 A1 | 5/2019 |
| WO | 2019094474 A1 | 5/2019 |
| WO | 2019/139564 A1 | 7/2019 |
| WO | 2019136556 A1 | 7/2019 |
| WO | 2019139564 A1 | 7/2019 |
| WO | 2020109426 A2 | 6/2020 |
| WO | 2020109427 A2 | 6/2020 |
| WO | 2020119957 A1 | 6/2020 |
| WO | 2021037586 A1 | 3/2021 |

(56) References Cited

FOREIGN PATENT DOCUMENTS

OTHER PUBLICATIONS

Restriction Requirement dated Dec. 15, 2020, U.S. Appl. No. 16/291,929, filed Oct. 5, 2018.
Notice of Allowance dated Dec. 11, 2020, U.S. Appl. No. 16/566,711, filed Sep. 10, 2019.
Final Office Action dated Sep. 3, 2020, U.S. Appl. No. 16/710,237, filed Dec. 11, 2019.
Office Action dated Feb. 11, 2021, U.S. Appl. No. 16/710,237, filed Dec. 11, 2019.
Office Action dated Dec. 3, 2020, U.S. Appl. No. 16/698,335, filed Nov. 11, 2019.
International Search Report and Written Opinion dated Nov. 6, 2020, PCT Application No. PCT/EP2020/072811.
International Search Report and Written Opinion dated Jul. 9, 2020, PCT Application No. PCT/EP2019/078195.
Office Action dated Jan. 14, 2021, U.S. Appl. No. 17/071,021, filed Oct. 20, 2020.
Office Action dated Dec. 30, 2020, U.S. Appl. No. 17/091,940, filed Nov. 6, 2020.
International Search Report and Written Opinion dated Feb. 3, 2021, PCT Application No. PCT/EP2020/066171.
International Search Report and Written Opinion dated Dec. 11, 2020, PCT Application No. PCT/EP2020/051814.
International Search Report and Written Opinion dated Dec. 20, 2020, PCT Application No. PCT/EP2020/051817.
International Search Report and Written Opinion dated Dec. 9, 2020, PCT Application No. PCT/EP2020/067043.
International Search Report and Written Opinion dated Oct. 5, 2017, PCT Application No. PCT/EP2017/058300.
International Preliminary Report on Patentability dated Oct. 18, 2018, PCT Application No. PCT/EP2017/058300.
Intention to Grant dated Dec. 12, 2019, EP Application No. 17715935.7.
Decision to Grant dated May 8, 2020, EP Application No. 17715935.7.
Office Action dated Dec. 29, 2019, U.S. Appl. No. 16/563,544, filed Sep. 16, 2019.
Notice of Allowance dated Apr. 22, 2020, U.S. Appl. No. 16/563,544, filed Sep. 16, 2019.
European Search Report dated Aug. 10, 2020, EP Application No. 20170700.7.
International Search Report and Written Opinion dated Sep. 22, 2017, PCT Application No. PCT/EP2017/058292.
International Preliminary Report on Patentability dated Oct. 18, 2018, PCT Application No. PCT/EP2017/058292.
Office Action dated Dec. 4, 2019, U.S. Appl. No. 16/563,689, filed Sep. 6, 2019.
Notice of Allowance dated May 20, 2020, U.S. Appl. No. 16/563,689, filed Sep. 6, 2019.
Corrected Notice of Allowability dated Jun. 19, 2020, U.S. Appl. No. 16/563,689, filed Sep. 6, 2019.
European Search Report dated Apr. 22, 2020, for European Application No. 20154638.9.
International Search Report and Written Opinion dated Jun. 29, 2018, PCT Application No. PCT/EP2018/058174.
International Preliminary Report on Patentability dated Oct. 10, 2019, PCT Application No. PCT/EP2018/058174.
Office Action dated Jan. 24, 2020, U.S. Appl. No. 16/566,711, filed Sep. 10, 2019.
Final Office Action dated Aug. 4, 2020, U.S. Appl. No. 16/566,711, filed Sep. 10, 2019.
Advisory Action dated Oct. 16, 2020, U.S. Appl. No. 16/566,711, filed Sep. 10, 2019.
European Article 94(3) Examination Report dated Jan. 15, 2020, for European Application No. 18714513.1.
European Article 94(3) Examination Report dated Jul. 29, 2020, for European Application No. 18714513.1.
European Search Report dated Dec. 4, 2019, for European Application No. 19198488.9.
European Article 94(3) Examination Report dated Feb. 3, 2020, for European Application No. 19198488.9.
Intention to Grant dated Aug. 10, 2020, for European Application No. 19198488.9.
Eurasian Office Action dated Sep. 3, 2020, for Eurasian Application No. 201992243/31.
International Search Report and Written Opinion dated Nov. 28, 2018, PCT Application No. PCT/EP2018/072811.
International Preliminary Report on Patentability dated Mar. 5, 2020, PCT Application No. PCT/EP2018/072811.
International Search Report and Written Opinion dated Feb. 14, 2020, PCT Application No. PCT/EP2019/057149.
Office Action dated Mar. 4, 2020, U.S. Appl. No. 16/710,237, filed Dec. 11, 2019.
International Search Report and Written Opinion dated Jun. 4, 2019, PCT Application No. PCT/EP2018/077568.
International Preliminary Report on Patentability dated Apr. 23, 2020, PCT Application No. PCT/EP2018/077568.
International Search Report and Written Opinion dated Jul. 9, 2020, PCT Application No. PCT/EP2018/082985.
International Search Report and Written Opinion dated Jul. 9, 2020, PCT Application No. PCT/EP2019/082808.
Office Action dated Feb. 24, 2020, U.S. Appl. No. 16/698,335, filed Nov. 11, 2019.
Final Office Action dated Jun. 24, 2020, U.S. Appl. No. 16/698,335, filed Nov. 11, 2019.
Hull, John William, et al., "Well-Integrity Monitoring and Analysis Using Distributed Fiber-Optic Acoustic Sensors," IADC/SPE Drilling Conference and Exhibition, Feb. 2-4, 2010, New Orleans, Louisiana, US, SPE-128304-MS, https://doi.org/10.2118/128304-MS.
isensys, "Sand Alert—Fixed and Portable Sand Monitoring," Isensys LLP, Sep. 2016, www.isensys.co.uk.
Johannessen, Kjetil, et al., "Distributed Acoustic Sensing—New Way of Listening to Your Well/Reservoir," SPE Intelligent Energy International, Mar. 27-29, 2012, Utrecht, NL, SPE-149602-MS, https://doi.org/10.2118/149602-MS.
Li, Meng, et al., "Current and Future Applications of Distributed Acoustic Sensing as a New Reservoir Geophysics Tool," The Open Petroleum Engineering Journal, 2015, 8, (Suppl 1: M3) 272-281.
MA, King, et al. "Deep Learning on Temporal-Spectral Data for Anomaly Detection," Department of Electrical and Computer Engineering, University of Calgary, Proc. of SPIE vol. 10190, 2017.
Martin, Shawn, "Can Oil Well Monitoring Systems Withstand Stimulation Treatments," Feb. 26, 2015, https://insights.globalspec.com/article/601/can-oil-well-monitoring-systems-withstand-stimulation-treatments [retrieved on Aug. 18, 2020].
Martinez, Roberto Jr., "Diagnosis of Fracture Flow Conditions With Acoustic Sensing," SPE Hydraulic Fracturing Technology Conference, Feb. 4-6, the Woodlands, Texas, US, Publication Date 2014.
Miller, Douglas E., et al., "Vertical Seismic Profiling Using a Fiber-optic Cable as a Distributed Acoustic Sensor," 74th EAGE Conference Exhibition incorporating SPE EUROPEC 2012, Copenhagen, Denmark, Jun. 4-7, 2012.
Mohd Daud, Farik, et al., "Successful Application of Ultrasound Technology to Detect Sand Producing Intervals in the Wellbore," International Petroleum Technology Conference, Nov. 15-17, 2011, Bangkok, Thailand, PTC-14737-MS, https://doi.org/10.2523/IPTC-14737-MS.
Molenaar, Menno M., et al., "First Downhole Application of Distributed Acoustic Sensing for Hydraulic-Fracturing Monitoring and Diagnostics," SPE Drilling Completion, vol. 27, Is. 1, Mar. 2012, SPE-140561-PA, https://doi.org/10.2118/140561-PA.
Mullens, Stephen, et al., "Fiber-Optic Distributed Vibration Sensing Provides Technique for Detecting Sand Production," Offshore Technology Conference, May 3-6, 2010, Houston, Texas, US, OTC-20429-MS, https://doi.org/10.4043/20429-MS.
Naldrett, G., et al., "Production Monitoring Using Next-Generation Distributed Sensing Systems," Petrophysics, vol. 59, No. 4 (Aug. 2018); pp. 496-510; 16 Figures. DOI: 10.30632/PJV59V4-2018a5.

(56) References Cited

OTHER PUBLICATIONS

Paleja, Rakesh, et al., "Velocity Tracking for Flow Monitoring and Production Profiling Using Distributed Acoustic Sensing," SPE Annual Technical Conference and Exhibition, Sep. 28-30, 2015, Houston, Texas, US, SPE-174823-MS, https://doi.org/10.2118/174823-MS.

Roxar sand monitor, https://www.emerson.com/en-us/automation/roxar.

Roxar, "Sand Monitor, Non-intrusive acoustic sensor," Draft 1-120209, Sundheim-Madison Feb. 2009.

Schultz, Whitney H., "Time-Lapse Multicomponent Geophone and DAS VSP Processing and Analysis," Colorado School of Mines, Geo-Physics Department, 2019.

Silixa, "Fracture Monitoring," https://silixa.com/solutions/oil-and-gas-downhole/frac-services/fracture-monitoring/.

Silixa, "Well Integrity," https://silixa.com/solutions/oil-and-gas-downhole/permanent-reservoir-and-well-surveillance/well-integrity/.

Silkina, Tatiana, "Application of Distributed Acoustic Sensing to Flow Regime Classification," Natural Gas Technology, Norwegian University of Science and Technology, Jun. 2014.

Stokely, Christopher L., "Acoustics-Based Flow Monitoring During Hydraulic Fracturing," SPE-179151-MS, Society of Petroleum Engineers, SPE Hydraulic Fracturing Technology Conference, Feb. 9-11, 2016, the Woodlands, Texas, USA, https://doi.org/10.2118/179151-MS.

Susilo, Yoliandri, et al., "Significant Increase in Sand Control Reliability of Open Hole Gravel Pack Completions in ACG Field—Azerbaijan," SPE European Formation Damage Conference Exhibition, Jun. 5-7, 2013, Noordwijk, SPE-165206-MS, https://doi.org/10.2118/165206-MS.

Tiffin, David L., et al., "Drawdown Guidelines for Sand Control Completions", SPE International, SPE 84495, Oct. 5, 2003 (Oct. 5, 2003), pp. 1-10, XP002361435.

van der Horst, Juun, et al., "Fibre Optic Sensing for Improved Wellbore Production Surveillance," International Petroleum Technology Conference, Jan. 19-22, 2014, Doha, Qatar, IPTC-17528-MS, https://doi.org/10.2523/IPTC-17528-MS.

Wang, Fang, et al., "Pipeline Leak Detection by Using Time-Domain Statistical Features," IEEE Sensors Journal, vol. 17, No. 19, Oct. 2017.

Wang, Kai, et al., "Vibration Sensor Approaches for the Monitoring of Sand Production in Bohai Bay," Hindawi Publishing Corporation, Shock and Vibration, vol. 2015, Article ID 591780, http://dx.doi.org/10.1155/2015/591780.

World first installation of a fiber optic acoustic sensor for reservoir monitoring, Oil and Gas Product News, Oct. 30, 2009.

WorldOil.com, "Adelous unveils distributed acoustic sensor solution for upstream oil gas," May 28, 2015. https://www.worldoil.com/news/2015/5/28/adelos-unveils-distributed-acoustic-sensor-solution-for-upstream-oil-gas.

Xiao, J., et al., "Dynamic Water Injection Profiling in Intelligent Wells Using Distributed Acoustic Sensor with Multimode Optical Fibers," SPE Annual Technical Conference and Exhibition, Sep. 28-30, 2015, Houston, Texas, US, SPE-174865-MS, https://doi.org/10.2118/174865-MS.

Xiao, J.J., et al., "Intelligent Distributed Acoustic Sensing for In-well Monitoring," SPE Saudi Arabia Section Technical Symposium and Exhibition, Apr. 21-24, 2014, Al-Khobar, SA, SPE-172197-MS, https://doi.org/10.2118/172197-MS.

Folkestad, Trond, et al., "Acoustic measurements detect sand in North Sea flow lines," Oil and Gas Journal; (USA), Journal vol. 88:35; Journal ID: ISSN 0030-1388.

Molenaar, Mathieu, et al., "Downhole tests show benefits of distributed acoustic sensing," Oil and Gas Journal 109(1):82-85, Jan. 2011.

Williams, J., "Distributed acoustic sensing for pipeline monitoring," Pipeline and Gas Journal Jul. 2012, vol. 239 No. 7.

Partial International Search Report Search Report dated Oct. 20, 2020, PCT Application No. PCT/EP2020/051814.

Partial International Search Report Search Report dated Oct. 16, 2020, PCT Application No. PCT/EP2020/051817.

Advisory Action dated Aug. 25, 2020, U.S. Appl. No. 16/698,335, filed Nov. 11, 2019.

International Search Report and Written Opinion dated Jan. 27, 2020, PCT Application No. PCT/EP2019/056425.

International Search Report and Written Opinion dated Feb. 28, 2020, PCT Application No. PCT/IB2019/055355.

International Search Report and Written Opinion dated Jun. 16, 2020, PCT Application No. PCT/EP2019/075385.

International Search Report and Written Opinion dated Jun. 16, 2020, PCT Application No. PCT/EP2019/075378.

International Search Report and Written Opinion dated Jun. 17, 2020, PCT Application No. PCT/US2019/046759.

International Search Report and Written Opinion dated May 12, 2020, PCT Application No. PCT/EP2019/072891.

International Search Report and Written Opinion dated Jun. 16, 2020, PCT Application No. PCT/EP2019/075387.

International Search Report and Written Opinion dated Jun. 16, 2020, PCT Application No. PCT/EP2019/075382.

Partial International Search Report Search Report dated Sep. 10, 2020, PCT Application No. PCT/EP2019/085454.

International Search Report and Written Opinion dated Jul. 9, 2020, PCT Application No. PCT/EP2019/078197.

International Search Report and Written Opinion dated May 29, 2020, PCT Application No. PCT/EP2019/082809.

Office Action dated Mar. 12, 2020, U.S. Appl. No. 16/698,407, filed Nov. 27, 2019.

Final Office Action dated Jun. 30, 2020, U.S. Appl. No. 16/698,407, filed Nov. 27, 2019.

Examination Report dated Jul. 15, 2020, GCC Application No. GC 2019-38726.

International Search Report and Written Opinion dated Jul. 24, 2020, PCT Application No. PCT/EP2019/081542.

International Search Report and Written Opinion dated Jul. 24, 2020, PCT Application No. PCT/EP2019/081545.

Abdelgaward, Ahemd, "Distributed Sand Monitoring Framework Using Wireless Sensor Networks," School of Engineering Technology, Central Michigan University, Mount Pleasant, MI 48859, US, Oct. 2013, vol. 1 Is. 1, pp. 1-10.

Abukhamsin, Ahmed Yasin, et al., "In Flow Profiling and Production Optimization in Smart Wells Using Di stri but ed Acoustic and Temperature Measurements," Jun. 1, 2017 (Jun. 1, 2017), XP055604495, Retrieved from the Internet: URL: https://pangea.stanford.edu/ERE/pdf/pereports/PhD/Abukhamsin2016.pdf [retrieved on Jul. 11, 2019] paragraphs [0001], [0002], [0004].

Bakku, Sudhish K., et al., "Vertical Seismic Profiling Using Distributed Acoustic Sensing in a Hydrofrac Treatment Well," SEG Technical Program Expanded Abstracts Denver 2014 ISSN (print): 1052-3812, ISSN (online): 1949-4645, https://doi.org/10.1190/segam2014-1559.1.

Broesch, James "Digital Signal Processing: Instant Access," Chapter 7, www.newnespress.com.

Brown, Gerald K., "External Acoustic Sensors and Instruments for the Detection of Sand in Oil and Gas Wells," Offshore Technology Conference, May 5-8, 1997, Houston, Texas, US, OTC-8478-MS, https://doi.org/10.4043/8478-MS.

Brown, Gerald K., et al., "Solids and Sand Monitoring—An Overview," Corrosion 2000, Mar. 26-31, Orlando, Florida, US, NACE International, NACE-00091.

Cannon, Robert Thayer, et al., "Distributed Acoustic Sensing: State of the Art," SPE Digital Energy Conference, Mar. 5-7, 2013, the Woodlands, Texas, US, SPE-163688-MS, https://doi.org/10.2118/163688-MS.

Chen, Jianyou, et al., "Distributed acoustic sensing coupling noise removal based on sparse optimization," Society of Exploration Geophysicists and American Association of Petroleum Geologists, vol. 7, Issue 2, May 2019, pp. 1M-T563, ISSN (print): 2324-8858, ISSN (online): 2324-8866, https://doi.org/10.1190/INT-2018-0080.1.

(56) References Cited

OTHER PUBLICATIONS

Chhantyal, Khim et al., "Upstream Ultrasonic Level Based Soft Sensing of Volumetric Flow of Non-Newtonian Fluids in Open Venturi Channels," IEEE Sensors Journal, vol. 18, No. 12, Jun. 15, 2018.

ClampOn DSP-06 Particle Monitor, Aug. 2009.

ClampOn SandQ® Monitor, Aug. 2014.

Conway, Chris, et al., "An introduction to fiber optic Intelligent Distributed Acoustic Sensing (iDAS) technology for power industry applications," 9th International Conference on Insulated Power Cables, Jicable15—Versailles Jun. 21-25, 2015, A3.4.

Correa, Julia, et al., "3D vertical seismic profile acquired with distributed acoustic sensing on tubing installation: A case study from the CO2CRC Otway Project" Interpretation—a Journal of Subsurface Characterization, 7(1), ISSN 2324-8858, Feb. 1, 2019, DOI 10.1190/INT-2018-0086.1, https://escholarship.org/uc/item/2br8g398.

Finfer, D.C., et al., "Borehole Flow Monitoring using a Non-intrusive Passive Distributed Acoustic Sensing (DAS)," Society of Petroleum Engineers, SPE-170844-MS, SPE Annual Technical Conference and Exhibition held in Amsterdam, the Netherlands, Oct. 27-29, 2014.

Gardner, Neil, et al., "Distributed Fiber-Optic Technologies Drive New Intervention Applications," SPE JPT-7975, vol. 67 | Issue: 1, Jan. 1, 2015.

Hill, David, Permanent real-time full wellbore flow monitoring using distributed fiber-optic sensing, OptaSense, 2015.

Hofman, Joachim, et al., "Analysis of the acoustic response in water and sand of different fiber optic sensing cables," SPIE Sensing Technology + Applications, 2015, Baltimore, Maryland, U.S., Proceedings vol. 9491, Sensors for Extreme Harsh Environments II; 94910E (2015) https://doi.org/10.1117/12.2178282.

\* cited by examiner

INFLOW DETECTION USING DTS FEATURES

CROSS-REFERENCE TO RELATED APPLICATIONS

This application claims the benefit of and priority to International Application No. PCT/EP2019/078195 filed Oct. 17, 2019 with the European Receiving office and entitled "Inflow Detection Using DTS Features" as a foreign priority claim, where such application is hereby incorporated herein by reference in its entirety for all purposes.

STATEMENT REGARDING FEDERALLY SPONSORED RESEARCH OR DEVELOPMENT

Not applicable.

BACKGROUND

To obtain hydrocarbons from subterranean formations, wellbores are drilled from the surface to access the hydrocarbon-bearing formation. After drilling a wellbore to the desired depth, a production string is installed in the wellbore to produce the hydrocarbons from one or more production zones of the formation to the surface. The production of the fluids can be detected at the wellhead based on total flow of fluid. However, it can be difficult to determine where the fluid is inflowing into the wellbore when multiple productions zones are present.

BRIEF SUMMARY

In some embodiments, a method of determining fluid inflow locations comprises determining a plurality of temperature features from a distributed temperature sensing signal originating in a wellbore, using the plurality of temperature features in a fluid inflow identification model, and determining the presence of fluid inflow at one or more locations along the wellbore based on an output from the fluid inflow identification model.

In some embodiments, a method of determining fluid inflow locations comprises determining a plurality of temperature features from a distributed temperature sensing signal originating in a wellbore, and determining the presence of fluid inflow at one or more locations along the wellbore using the plurality of temperature features. The plurality of temperature features comprise at least two of: a depth derivative of temperature with respect to depth, a temperature excursion measurement, a baseline temperature excursion, or a peak-to-peak value.

In some embodiments, a system of determining fluid inflow locations within a wellbore comprises a processor, a memory, and an analysis program stored in the memory. The analysis program is configured, when executed on the processor, to receive a distributed temperature sensing signal, wherein the distributed temperature sensing signal originates within the wellbore, determine a plurality of temperature features from the distributed temperature sensing signal, use the plurality of temperature features in a fluid inflow identification model, and determine the presence of fluid inflow at one or more locations along the wellbore based on an output from the fluid inflow identification model.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
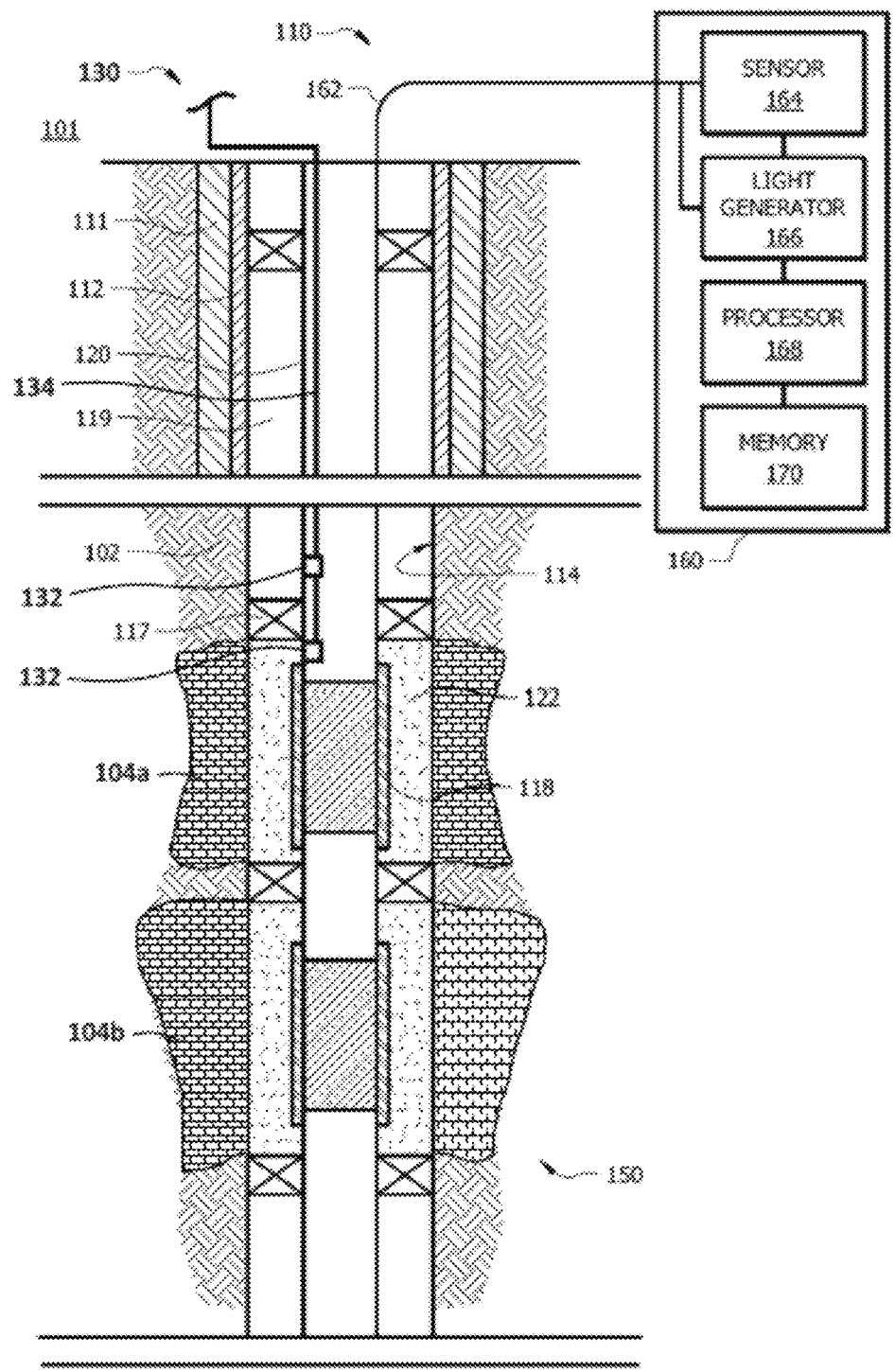
FIG. 1 is a schematic, cross-sectional illustration of a downhole wellbore environment according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "above" meaning toward the surface of the wellbore and with "down," "lower," "downward," "downstream," or "below" meaning toward the terminal end of the well, regardless of the wellbore orientation. Reference to inner or outer will be made for purposes of description with "in," "inner," or "inward" meaning towards the central longitudinal axis of the wellbore and/or wellbore tubular, and "out," "outer," or "outward" meaning towards the wellbore wall. As used herein, the term "longitudinal" or "longitudinally" refers to an axis substantially aligned with the central axis of the wellbore tubular, and "radial" or "radially" refer to a direction perpendicular to the longitudinal axis. The various characteristics mentioned above, as well as other features and characteristics described in more detail below, will be readily apparent to those skilled in the art with the aid of this disclosure upon reading the following detailed description of the embodiments, and by referring to the accompanying drawings.

As utilized herein, a 'fluid inflow event' includes fluid inflow (e.g., any fluid inflow regardless of composition thereof), gas phase inflow, aqueous phase inflow, and/or hydrocarbon phase inflow. The fluid can comprise other components such as solid particulate matter (e.g., sand, etc.) in some embodiments, as discussed in more detail herein.

Disclosed herein are systems and methods for detecting and/or characterizing fluid inflow event locations and an estimation of the inflow quantities within a subterranean wellbore, so that a wellbore operator may more effectively control the fluid production from the wellbore. The systems allow for an identification of the inflow locations as well as the inflow rates at those locations using temperature features derived from temperature measurements as well as frequency domain features obtained from acoustic signals.

In some embodiments, temperature features can be determined from temperature measurements taken along the length of the wellbore. The temperature measurements can be used in a fluid inflow identification model that can provide an output indicative of fluid inflow event locations along the wellbore. This can allow those locations with inflow to be identified using temperature based measurements from the wellbore. When combined with a distributed temperature sensing system that can provide distributed and continuous temperature measurements, the systems can allow for fluid inflow locations to be tracked through time.

The systems described herein also allow for various frequency domain features to be obtained from an acoustic signal originating within the wellbore. The acoustic signals can be obtained using a distributed acoustic sensing (DAS) system that allows for continuous and distributed acoustic sensing. The acoustic signals can be taken along the same portions of the wellbore as the temperature measurements, thereby allowing for information about the wellbore, and more particularly, fluid inflow events, to be determined using both the temperature features and the frequency domain features. In some embodiments, a fluid inflow model can be developed and used with one or more frequency domain features that can allow for the prediction of fluid inflow rates for one or more fluids and/or fluid phases.

When used together, the fluid inflow identification model can allow the inflow locations to be determined using temperature features, and the fluid inflow model can allow for fluid inflow rates to be determined at the one or more fluid inflow locations. The fluid inflow rates as determined from the fluid inflow model can be used to verify or validate the fluid inflow locations as determined from the fluid inflow identification model. This can help to provide an improved fluid inflow location determination for use in managing the production of fluids from the wellbore.

The fluid inflow model can also be used to determine the fluid inflow rates of one or more fluids, fluid phases (e.g., combined gas flow, combined liquid flow, etc.), or both from one or more locations along the wellbore. The processing can be combined such that the fluid inflow model may only be executed at the one or more locations as identified using the temperature features with the fluid inflow identification model. The resulting fluid inflow rates as determined from the fluid inflow model can be used to provide an indication of the fluid inflow rates at the one or more locations. The resulting fluid inflow rate can also be normalized across the one or more locations to provide a relative contribution to the total fluid inflow rates at the one or more locations. This information can be used along with actual fluid production rates to provide an improved determination of the actual fluid inflow rates at one or more locations within the wellbore. This can allow the well operator to have near real time information on the wellbore to more effectively manage the production of fluids from the wellbore.

Referring now to FIG. 1, a schematic, cross-sectional illustration of a downhole wellbore operating environment 101 according to some embodiments is shown. More specifically, environment 101 includes a wellbore 114 traversing a subterranean formation 102, casing 112 lining at least a portion of wellbore 114, and a tubular 120 extending through wellbore 114 and casing 112. A plurality of completion assemblies such as spaced screen elements or assemblies 118 may be provided along tubular 120 at one or more production zones 104a, 104b within the subterranean formation 102. In particular, two production zones 104a, 104b are depicted within subterranean formation 102 of FIG. 1; however, the precise number and spacing of the production zones 104a, 104b may be varied in different embodiments. The completion assemblies can comprise flow control devices such as sliding sleeves, adjustable chokes, and/or inflow control devices to allow for control of the flow from each production zone. The production zones 104a, 104b may be layers, zones, or strata of formation 102 that contain hydrocarbon fluids (e.g., oil, gas, condensate, etc.) therein.

In addition, a plurality of spaced zonal isolation devices 117 and gravel packs 122 may be provided between tubular 120 and the sidewall of wellbore 114 at or along the interface of the wellbore 114 with the production zones 104a, 104b. In some embodiments, the operating environment 101 includes a workover and/or drilling rig positioned at the surface and extending over the wellbore 114. While FIG. 1 shows an example completion configuration in FIG. 1, it should be appreciated that other configurations and equipment may be present in place of or in addition to the illustrated configurations and equipment. For example, sections of the wellbore 114 can be completed as open hole completions or with gravel packs without completion assemblies.

In general, the wellbore 114 can be formed in the subterranean formation 102 using any suitable technique (e.g., drilling). The wellbore 114 can extend substantially vertically from the earth's surface over a vertical wellbore portion, deviate from vertical relative to the earth's surface over a deviated wellbore portion, and/or transition to a horizontal wellbore portion. In general, all or portions of a wellbore may be vertical, deviated at any suitable angle, horizontal, and/or curved. In addition, the wellbore 114 can be a new wellbore, an existing wellbore, a straight wellbore, an extended reach wellbore, a sidetracked wellbore, a multi-lateral wellbore, and other types of wellbores for drilling and completing one or more production zones. As illustrated, the wellbore 114 includes a substantially vertical producing section 150 which includes the production zones 104a, 104b. In this embodiment, producing section 150 is an open-hole completion (i.e., casing 112 does not extend through producing section 150). Although section 150 is illustrated as a vertical and open-hole portion of wellbore 114 in FIG. 1, embodiments disclosed herein can be employed in sections of wellbores having any orientation, and in open or cased sections of wellbores. The casing 112 extends into the wellbore 114 from the surface and can be secured within the wellbore 114 with cement 111.

The tubular 120 may comprise any suitable downhole tubular or tubular string (e.g., drill string, casing, liner, jointed tubing, and/or coiled tubing, etc.), and may be inserted within wellbore 114 for any suitable operation(s) (e.g., drilling, completion, intervention, workover, treatment, production, etc.). In the embodiment shown in FIG. 2, the tubular 120 is a completion assembly string. In addition, the tubular 120 may be disposed within in any or all portions of the wellbore 114 (e.g., vertical, deviated, horizontal, and/or curved section of wellbore 114).

In this embodiment, the tubular 120 extends from the surface to the production zones 104a, 104b and generally provides a conduit for fluids to travel from the formation 102 (particularly from production zones 104a, 104b) to the surface. A completion assembly including the tubular 120 can include a variety of other equipment or downhole tools to facilitate the production of the formation fluids from the production zones. For example, zonal isolation devices 117 can be used to isolate the production zones 104a, 104b within the wellbore 114. In this embodiment, each zonal isolation device 117 comprises a packer (e.g., production packer, gravel pack packer, frac-pac packer, etc.). The zonal isolation devices 117 can be positioned between the screen assemblies 118, for example, to isolate different gravel pack zones or intervals along the wellbore 114 from each other. In general, the space between each pair of adjacent zonal isolation devices 117 defines a production interval, and each production interval may correspond with one of the production zones 104a, 104b of subterranean formation 102.

The screen assemblies 118 provide sand control capability. In particular, the sand control screen elements 118, or other filter media associated with wellbore tubular 120, can be designed to allow fluids to flow therethrough but restrict and/or prevent particulate matter of sufficient size from flowing therethrough. The screen assemblies 118 can be of any suitable type such as the type known as "wire-wrapped", which are made up of a wire closely wrapped helically about a wellbore tubular, with a spacing between the wire wraps being chosen to allow fluid flow through the filter media while keeping particulates that are greater than a selected size from passing between the wire wraps. Other types of filter media can also be provided along the tubular 120 and can include any type of structures commonly used in gravel pack well completions, which permit the flow of fluids through the filter or screen while restricting and/or blocking the flow of particulates (e.g. other commercially-available screens, slotted or perforated liners or pipes; sintered-metal screens; sintered-sized, mesh screens; screened pipes; pre-packed screens and/or liners; or combinations thereof). A protective outer shroud having a plurality of perforations therethrough may be positioned around the exterior of any such filter medium.

The gravel packs 122 can be formed in the annulus 119 between the screen elements 118 (or tubular 120) and the sidewall of the wellbore 114 in an open hole completion. In general, the gravel packs 122 comprise relatively coarse granular material placed in the annulus to form a rough screen against the ingress of sand into the wellbore while also supporting the wellbore wall. The gravel pack 122 is optional and may not be present in all completions.

In some embodiments, one or more of the completion assemblies can comprise flow control elements such as sliding sleeves, chokes, valves, or other types of flow control devices that can control the flow of a fluid from an individual production zone or a group of production zones. The force on the production face can then vary based on the type of completion within the wellbore and/or each production zone (e.g., in a sliding sleeve completion, open hole completion, gravel pack completion, etc.). In some embodiments, a sliding sleeve or other flow controlled production zone can experience a force on the production face that is relatively uniform within the production zone, and the force on the production face can be different between each production zone. For example, a first production zone can have a specific flow control setting that allows the production rate from the first zone to be different than the production rate from a second production zone. Thus, the choice of completion type (e.g., which can be specified in a completion plan) can affect on the need for or the ability to provide a different production rate within different production zones.

Referring still to FIG. 1, a monitoring system 110 can comprise an acoustic monitoring system and/or a temperature monitoring system. The monitoring system 1110 can be positioned in the wellbore 114. As described herein, the monitoring system 110 may be utilized to detect or monitor fluid inflow event(s) into the wellbore 114. The various monitoring systems (e.g., acoustic monitoring systems, temperature monitoring systems, etc.) may be referred to herein as an "inflow detection system," and/or an "inflow monitoring system."

Figure 2A:
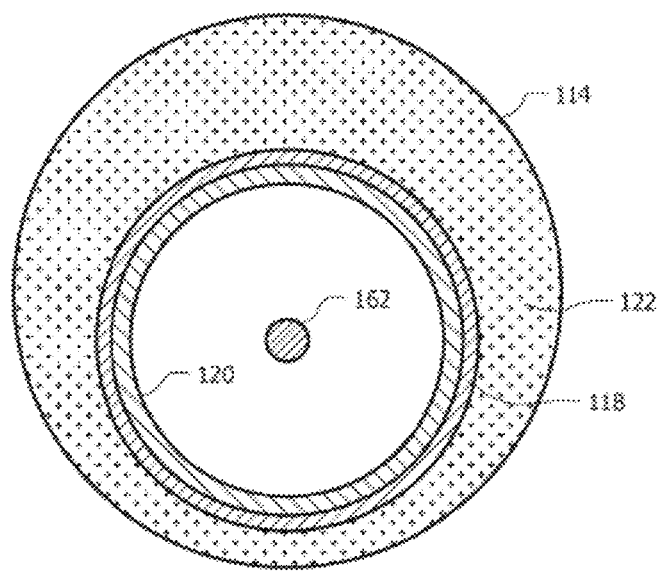
FIGS. 2A and 2B are a schematic, cross-sectional views of embodiments of a well with a wellbore tubular having an optical fiber inserted therein according to some embodiments.
Figure 2B:
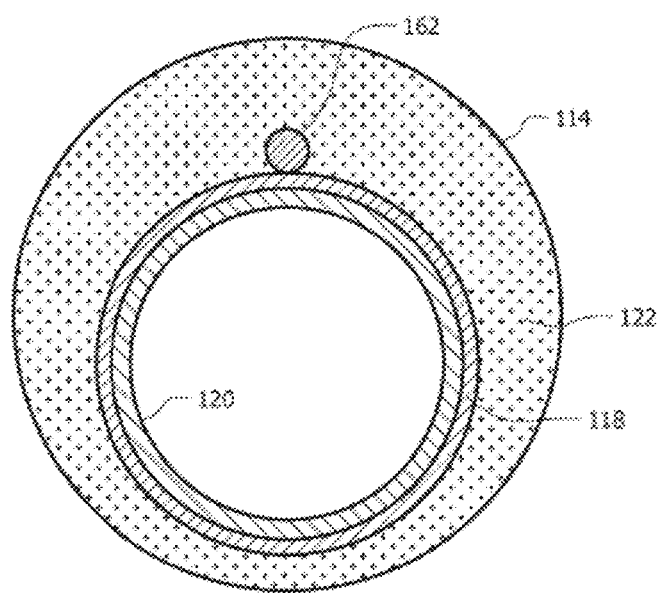

The monitoring system 110 comprises an optical fiber 162 that is coupled to and extends along tubular 120. In cased completions, the optical fiber 162 can be installed between the casing and the wellbore wall within a cement layer and/or installed within the casing or production tubing. Referring briefly to FIGS. 2A and 2B, optical fiber 162 of the monitoring system 110 may be coupled to an exterior of tubular 120 (e.g., such as shown in FIG. 2B) or an interior of tubular (e.g., such as shown in FIG. 2A). When the optical fiber 162 is coupled to the exterior of the tubular 120, as depicted in the embodiment of FIG. 2B, the optical fiber 162 can be positioned within a control line, control channel, or recess in the tubular 120. In some embodiments an outer shroud contains the tubular 120 and protects the optical fiber 162 during installation. A control line or channel can be formed in the shroud and the optical fiber 162 can be placed in the control line or channel (not specifically shown in FIGS. 2A and 2B).

Referring again to FIG. 1, generally speaking, during operation of the monitoring system, an optical backscatter component of light injected into the optical fiber 162 may be used to detect various conditions incident on the optical fiber such as acoustic perturbations (e.g., dynamic strain), temperature, static strain, and the like along the length of the optical fiber 162. The light can be generated by a light generator or source 166 such as a laser, which can generate light pulses. The light used in the system is not limited to the visible spectrum, and light of any frequency can be used with the systems described herein. Accordingly, the optical fiber 162 acts as the sensor element with no additional transducers in the optical path, and measurements can be taken along the length of the entire optical fiber 162. The measurements can then be detected by an optical receiver such as sensor 164 and selectively filtered to obtain measurements from a given depth point or range, thereby providing for a distributed measurement that has selective data for a plurality of zones (e.g., production zones 104a, 104b) along the optical fiber 162 at any given time. For example, time of flight measurements of the backscattered light can be used to identify individual zones or measurement lengths of the fiber optic 162. In this manner, the optical fiber 162 effectively functions as a distributed array of sensors spread over the entire length of the optical fiber 162, which typically across production zones 104a, 104b within the wellbore 114.

The light backscattered up the optical fiber 162 as a result of the optical backscatter can travel back to the source, where the signal can be collected by a sensor 164 and processed (e.g., using a processor 168). In general, the time the light takes to return to the collection point is proportional to the distance traveled along the optical fiber 162, thereby allowing time of flight measurements of distance along the optical fiber. The resulting backscattered light arising along the length of the optical fiber 162 can be used to characterize the environment around the optical fiber 162. The use of a controlled light source 166 (e.g., having a controlled spectral width and frequency) may allow the backscatter to be collected and any parameters and/or disturbances along the length of the optical fiber 162 to be analyzed. In general, the various parameters and/or disturbances along the length of the optical fiber 162 can result in a change in the properties of the backscattered light.

An acquisition device 160 may be coupled to one end of the optical fiber 162 that comprises the sensor 164, light generator 166, a processor 168, and a memory 170. As discussed herein, the light source 166 can generate the light (e.g., one or more light pulses), and the sensor 164 can collect and analyze the backscattered light returning up the optical fiber 162. In some contexts, the acquisition device 160 (which comprises the light source 166 and the sensor 164 as noted above), can be referred to as an interrogator. The processor 168 may be in signal communication with the sensor 164 and may perform various analysis steps described in more detail herein. While shown as being within the acquisition device 160, the processor 168 can also be located outside of the acquisition device 160 including being located remotely from the acquisition device 160. The sensor 164 can be used to obtain data at various rates and may obtain data at a sufficient rate to detect the acoustic signals of interest with sufficient bandwidth. While described as a sensor 164 in a singular sense, the sensor 164 can comprise one or more photodetectors or other sensors that can allow one or more light beams and/or backscattered light to be detected for further processing. In an embodiment, depth resolution ranges in a range of from about 1 meter to about 10 meters, or less than or equal to about 10, 9, 8, 7, 6, 5, 4, 3, 2, or 1 meter can be achieved. Depending on the resolution needed, larger averages or ranges can be used for computing purposes. When a high depth resolution is not needed, a system may have a wider resolution (e.g., which may be less expensive) can also be used in some embodiments. Data acquired by the monitoring system 110 (e.g., via fiber 162, sensor 164, etc.) may be stored on memory 170.

The monitoring system 110 can be used for detecting a variety of parameters and/or disturbances in the wellbore including being used to detect temperatures along the wellbore, acoustic signals along the wellbore, static strain and/or pressure along the wellbore, or any combination thereof.

In some embodiments, the monitoring system 110 can be used to detect temperatures within the wellbore. The temperature monitoring system can include a distributed temperature sensing (DTS) system. A DTS system can rely on light injected into the optical fiber 162 along with the reflected signals to determine a temperature and/or strain based on optical time-domain reflectometry. In order to obtain DTS measurements, a pulsed laser from the light generator 166 can be coupled to the optical fiber 162 that serves as the sensing element. The injected light can be backscattered as the pulse propagates through the optical fiber 162 owing to density and composition as well as to molecular and bulk vibrations. A portion of the backscattered light can be guided back to the acquisition device 160 and split off by a directional coupler to a sensor 164. It is expected that the intensity of the backscattered light decays exponentially with time. As the speed of light within the optical fiber 162 is known, the distance that the light has passed through the optical fiber 162 can be derived using time of flight measurements.

In both distributed acoustic sensing (DAS) and DTS systems, the backscattered light includes different spectral components which contain peaks that are known as Rayleigh and Brillouin peaks and Raman bands. The Rayleigh peaks are independent of temperature and can be used to determine the DAS components of the backscattered light. The Raman spectral bands are caused by thermally influenced molecular vibrations. The Raman spectral bands can then be used to obtain information about distribution of temperature along the length of the optical fiber 162 disposed in the wellbore.

The Raman backscattered light has two components, Stokes and Anti-Stokes, one being only weakly dependent on temperature and the other being greatly influenced by temperature. The relative intensities between the Stokes and Anti-Stokes components are a function of temperature at which the backscattering occurred. Therefore, temperature can be determined at any point along the length of the optical fiber 162 by comparing at each point the Stokes and Anti-stokes components of the light backscattered from the particular point. The Brillouin peaks may be used to monitor strain along the length of the optical fiber 162.

The DTS system can then be used to provide a temperature measurement along the length of the wellbore during the production of fluids, including fluid inflow events. The DTS system can represent a separate system from the DAS system or a single common system, which can comprise one or more acquisition devices in some embodiments. In some embodiments, a plurality of fibers 162 are present within the wellbore, and the DAS system can be coupled to a first optical fiber and the DTS system can be coupled to a second, different, optical fiber. Alternatively, a single optical fiber can be used with both systems, and a time division multiplexing or other process can be used to measure both DAS and DTS on the same optical fiber.

In an embodiment, depth resolution for the DTS system can range from about 1 meter to about 10 meters, or less than or equal to about 10, 9, 8, 7, 6, 5, 4, 3, 2, or 1 meter can be achieved. Depending on the resolution needed, larger averages or ranges can be used for computing purposes. When a high depth resolution is not needed, a system may have a wider resolution (e.g., which may be less expensive) can also be used in some embodiments. Data acquired by the DTS system 110 (e.g., via fiber 162, sensor 164, etc.) may be stored on memory 170.

While the temperature monitoring system described herein can use a DTS system to acquire the temperature measurements for a location or depth range in the wellbore 114, in general, any suitable temperature monitoring system can be used. For example, various point sensors, thermocouples, resistive temperature sensors, or other sensors can be used to provide temperature measurements at a given location based on the temperature measurement processing described herein. Further, an optical fiber comprising a plurality of point sensors such as Bragg gratings can also be used. As described herein, a benefit of the use of the DTS system is that temperature measurements can be obtained across a plurality of locations and/or across a continuous length of the wellbore 114 rather than at discrete locations.

The monitoring system 110 can comprise an acoustic monitoring system to monitor acoustic signals within the wellbore. The acoustic monitoring system can comprise a DAS based system, though other types of acoustic monitoring systems, including other distributed monitoring systems, can also be used.

During operation of a DAS system an optical backscatter component of light injected into the optical fiber 162 (e.g., Rayleigh backscatter) may be used to detect acoustic perturbations (e.g., dynamic strain) along the length of the fiber 162. The light backscattered up the optical fiber 162 as a result of the optical backscatter can travel back to the source, where the signal can be collected by a sensor 164 and processed (e.g., using a processor 168) as described herein. In general, any acoustic or dynamic strain disturbances along the length of the optical fiber 162 can result in a change in the properties of the backscattered light, allowing for a distributed measurement of both the acoustic magnitude (e.g., amplitude), frequency and, in some cases, of the relative phase of the disturbance. Any suitable detection methods including the use of highly coherent light beams, compensating interferometers, local oscillators, and the like can be used to produce one or more signals that can be processed to determine the acoustic signals or strain impacting the optical fiber along its length.

While the system 101 described herein can be used with a DAS system (e.g., DAS system 110) to acquire an acoustic signal for a location or depth range in the wellbore 114, in general, any suitable acoustic signal acquisition system can be used in performing embodiments of method 10 (see e.g., FIG. 1). For example, various microphones, geophones, hydrophones, or other sensors can be used to provide an acoustic signal at a given location based on the acoustic signal processing described herein. Further, an optical fiber comprising a plurality of point sensors such as Bragg gratings can also be used. As described herein, a benefit of the use of the DAS system 110 is that an acoustic signal can be obtained across a plurality of locations and/or across a continuous length of the wellbore 114 rather than at discrete locations.

The monitoring system 110 can be used to generate temperature measurements and/or acoustic measurements along the length of the wellbore. The resulting measurements can be processed to obtain various temperature and/or acoustic based features that can then be used to identify inflow locations, identify inflowing fluid phases, and/or quantify the rate of fluid inflow. Each of the specific types of features obtained from the monitoring system are described in more detail below.

Fluid can be produced into the wellbore 114 and into the completion assembly string. During operations, the fluid flowing into the wellbore may comprise hydrocarbon fluids, such as, for instance hydrocarbon liquids (e.g., oil), gases (e.g., natural gas such as methane, ethane, etc.), and/or water, any of which can also comprise particulates such as sand. However, the fluid flowing into the tubular may also comprise other components, such as, for instance steam, carbon dioxide, and/or various multiphase mixed flows. The fluid flow can further be time varying such as including slugging, bubbling, or time altering flow rates of different phases. The amounts or flow rates of these components can vary over time based on conditions within the formation 102 and the wellbore 114. Likewise, the composition of the fluid flowing into the tubular 120 sections throughout the length of the entire production string (e.g., including the amount of sand contained within the fluid flow) can vary significantly from section to section at any given time.

As the fluid enters the wellbore 114, the fluid can create acoustic signals and temperature changes that can be detected by the monitoring system such as the DTS system and/or the DAS systems as described herein. With respect to the temperature variations, the temperature changes can result from various fluid effects within the wellbore such as cooling based on gas entering the wellbore, temperature changes resulting from liquids entering the wellbore, and various flow related temperature changes as a result of the fluids passing through the wellbore. For example, as fluids enter the wellbore, the fluids can experience a sudden pressure drop, which can result in a change in the temperature. The magnitude of the temperature change depends on the phase and composition of the inflowing fluid, the pressure drop, and the pressure and temperature conditions. The other major thermodynamic process that takes place as the fluid enters the well is thermal mixing which results from the heat exchange between the fluid body that flows into the wellbore and the fluid that is already flowing in the wellbore. As a result, inflow of fluids from the reservoir into the wellbore can cause a deviation in the flowing well temperature profile.

By obtaining the temperature in the wellbore, a number of temperature features can be obtained from the temperature measurements. The temperature features can provide an indication of one or more temperature trends at a given location in the wellbore during a measurement period. The resulting features can form a distribution of temperature results that can then be used with various models to identify one or more events within the wellbore at the location.

The temperature measurements can represent output values from the DTS system, which can be used with or without various types of pre-processing such as noise reduction, smoothing, and the like. When background temperature measurements are used, the background measurement can represent a temperature measurement at a location within the wellbore taken in the absence of the flow of a fluid. For example, a temperature profile along the wellbore can be taken when the well is initially formed and/or the wellbore can be shut in and allowed to equilibrate to some degree before measuring the temperatures at various points in the wellbore. The resulting background temperature measurements or temperature profile can then be used in determining the temperature features in some embodiments.

In general, the temperature features represent statistical variations of the temperature measurements through time and/or depth. For example, the temperature features can represent statistical measurements or functions of the temperature within the wellbore that can be used with various models to determine whether or not fluid inflow events have occurred. The temperature features can be determined using various functions and transformations, and in some embodiments can represent a distribution of results. In some embodiments, the temperature features can represent a normal or Gaussian distribution. The resulting distributions can then be used with models such as multivariate models to determine the presence of the fluid inflow events.

In some embodiments, the temperature features can include various features including, but not limited to, a depth derivative of temperature with respect to depth, a temperature excursion measurement, a baseline temperature excursion, a peak-to-peak value, and combinations thereof.

A depth derivative of temperature with respect to depth. This feature can be determined by taking the temperature measurements along the wellbore and smoothing the measurements. Smoothing can comprise a variety of steps including filtering the results, de-noising the results, or the like. In some embodiments, the temperature measurements can be median filtered within a given window to smooth the measurements. Once smoothed, the change in the temperature with depth can be determined. In some embodiments, this can include taking a derivative of the temperature measurements with respect to depth along the longitudinal axis of the wellbore. The depth derivative of temperature values can then be processed, and the measurement with a zero value (e.g., representing a point of no change in temperature with depth) that have preceding and proceeding values that are non-zero and have opposite signs in depth (e.g., zero below which the value is negative and above positive or vice versa) can have the values assign to the nearest value. This can then result in a set of measurements representing the depth derivative of temperature with respect to depth.

In some embodiments, the temperature features can comprise a temperature excursion measurement. The temperature excursion measurement can comprise a difference between a temperature reading at a first depth and a smoothed temperature reading over a depth range, where the first depth is within the depth range. In some embodiments, the temperature excursion measurement can represent a difference between de-trended temperature measurements over an interval and the actual temperature measurements within the interval. For example, a depth range can be selected within the wellbore. The temperature readings within a time window can be obtained within the depth range and de-trended or smoothed. In some embodiments, the de-trending or smoothing can include any of those processes described above, such as using median filtering of the data within a window within the depth range. For median filtering, the larger the window of values used, the greater the smoothing effect can be on the measurements. For the temperature excursion measurement, a range of windows from about 10 to about 100 values, or between about 20-60 values (e.g., measurements of temperature within the depth range) can be used to median filter the temperature measurements. A difference can then be taken between the temperature measurement at a location and the de-trended (e.g., median filtered) temperature values. The temperature measurements at a location can be within the depth range and the values being used for the median filtering. This temperature feature then represents a temperature excursion at a location along the wellbore from a smoothed temperature measurement over a larger range of depths around the location in the wellbore.

In some embodiments, the temperature features can comprise a baseline temperature excursion. The baseline temperature excursion represents a difference between a de-trended baseline temperature profile and the current temperature at a given depth. In some embodiments, the baseline temperature excursion can rely on a baseline temperature profile that can contain or define the baseline temperatures along the length of the wellbore. As described herein, the baseline temperatures represent the temperature as measured when the wellbore is shut in. This can represent a temperature profile of the formation in the absence of fluid flow. While the wellbore may affect the baseline temperature readings, the baseline temperature profile can approximate a formation temperature profile. The baseline temperature profile can be determined when the wellbore is shut in and/or during formation of the wellbore, and the resulting baseline temperature profile can be used over time. If the condition of the wellbore changes over time, the wellbore can be shut in and a new baseline temperature profile can be measured or determined. It is not expected that the baseline temperature profile is re-determined at specific intervals, and rather it would be determined at discrete times in the life of the wellbore. In some embodiments, the baseline temperature profile can be re-determined and used to determine one or more temperature features such as the baseline temperature excursion.

Once the baseline temperature profile is obtained, the baseline temperature measurements at a location in the wellbore can be subtracted from the temperature measurement detected by the temperature monitoring system at that location to provide baseline subtracted values. The results can then be obtained and smoothed or de-trended. For example, the resulting baseline subtracted values can be median filtered within a window to smooth the data. In some embodiments, a window between 10 and 500 temperature values, between 50 and 400 temperature values, or between 100 and 300 temperature values can be used to median filter the resulting baseline subtracted values. The resulting smoothed baseline subtracted values can then be processed to determine a change in the smoothed baseline subtracted values with depth. In some embodiments, this can include taking a derivative of the smoothed baseline subtracted values with respect to depth along the longitudinal axis of the wellbore. The resulting values can represent the baseline temperature excursion feature.

In some embodiments, the temperature features can comprise a peak-to-peak temperature value. This feature can represent the difference between the maximum and minimum values (e.g., the range, etc.) within the temperature profile along the wellbore. In some embodiments, the peak-to-peak temperature values can be determined by detecting the maximum temperature readings (e.g., the peaks) and the minimum temperature values (e.g., the dips) within the temperature profile along the wellbore. The difference can then be determined within the temperature profile to determine peak-to-peak values along the length of the wellbore. The resulting peak-to-peak values can then be processed to determine a change in the peak-to-peak values with respect to depth. In some embodiments, this can include taking a derivative of the peak-to-peak values with respect to depth along the longitudinal axis of the wellbore. The resulting values can represent the peak-to-peak temperature values.

Other temperature features can also be determined from the temperature measurements. In some embodiments, various statistical measurements can be obtained from the temperature measurements along the wellbore to determine one or more temperature features. For example, a cross-correlation of the temperature measurements with respect to time can be used to determine a cross-correlated temperature feature. The temperature measurements can be smoothed as described herein prior to determining the cross-correlation with respect to time. As another example, an autocorrelation measurement of the temperature measurements can be obtained with respect to depth. The temperature measurements can be smoothed and/or the resulting autocorrelation measurements can be smoothed as described herein to determine the autocorrelation temperature features.

In some embodiments, the temperature features can be based on dynamic temperature measurements rather than steady state or flowing temperature measurements. In order to obtain dynamic temperature measurements, a change in the operation of the wellbore can be introduced, and the temperature monitored using the temperature monitoring system. The change in conditions can be introduced by shutting in the wellbore, opening one or more sections of the wellbore to flow, introducing a fluid to the wellbore (e.g., injecting a fluid), and the like. When the wellbore is shut in from a flowing state, the temperature profile along the wellbore may be expected to change from the flowing profile to the baseline profile over time. Similarly, when a wellbore that is shut in is opened for flow, the temperature profile may change from a baseline profile to a flowing profile. Based on the change in the condition of the wellbore, the temperature measurements can change dynamically over time. In some embodiments, this approach can allow for a contrast in thermal conductivity to be determined between a location or interval having radial flow (e.g., into or out of the wellbore) to a location or interval without radial flow. One or more temperature features can then be determined using the dynamic temperature measurements. Once the temperature features are determined from the temperature measurements obtained from the temperature monitoring system, one or more of the temperature features can be used to identify fluid inflow events within the wellbore, as described in more detail herein.

As described with respect to the temperature measurements, the inflow of fluids into the wellbore 114 can also create acoustic sounds that can be detected using the acoustic monitoring system such as a DAS system. Accordingly, the flow of the various fluids into the wellbore 114 and/or through the wellbore 114 can create vibrations or acoustic sounds that can be detected using acoustic monitoring system. Each type of inflow event such as the different fluid flows and fluid flow locations can produce an acoustic signature with unique frequency domain features.

As used herein, various frequency domain features can be obtained from the acoustic signal, and in some contexts, the frequency domain features can also be referred to herein as spectral features or spectral descriptors. The frequency domain features are features obtained from a frequency domain analysis of the acoustic signals obtained within the wellbore. The frequency domain features can be derived from the full spectrum of the frequency domain of the acoustic signal such that each of the frequency domain features can be representative of the frequency spectrum of the acoustic signal. Further, a plurality of different frequency domain features can be obtained from the same acoustic signal (e.g., the same acoustic signal at a location or depth within the wellbore), where each of the different frequency domain features is representative of frequencies across the same frequency spectrum of the acoustic signal as the other frequency domain features. For example, the frequency domain features (e.g., each frequency domain feature) can be a statistical shape measurement or spectral shape function of the spectral power measurement across the same frequency bandwidth of the acoustic signal. Further, as used herein, frequency domain features can also refer to features or feature sets derived from one or more frequency domain features, including combinations of features, mathematical modifications to the one or more frequency domain features, rates of change of the one or more frequency domain features, and the like.

Figure 3:
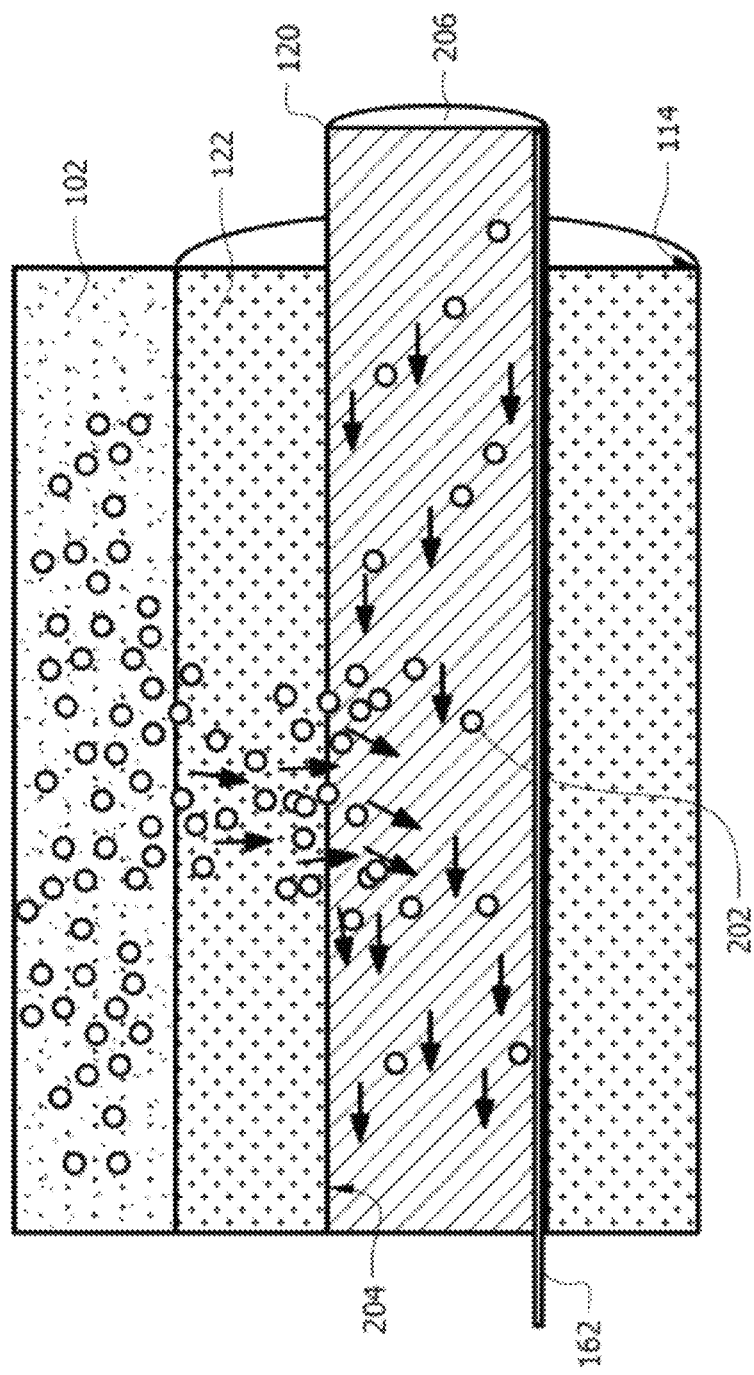
FIG. 3 is a schematic view of an embodiment of a wellbore tubular with fluid inflow and sand ingress according to some embodiments.

The frequency domain features can be determined by processing the acoustic signals from within the wellbore at one or more locations along the wellbore. As the acoustics signals at a given location along the wellbore contain a combination of acoustic signals, the determination of the frequency domain features can be used to separate and identify individual fluid inflow events. As an example, FIG. 3 illustrates sand 202 flowing from the formation 102 into the wellbore 114 and then into the tubular 120. As the sand 202 flows into the tubular 120, it can collide against the inner surface 204 of the tubular 120, and with the fiber 162 (e.g., in cases where the fiber 162 is placed within the tubular 120), in a random fashion. Without being limited by this or any particular theory, the intensity of the collisions depends on the effective mass and the rate of change in the velocity of the impinging sand particles 202, which can depend on a number of factors including, without limitation, the direction of travel of the sand 202 in the wellbore 114 and/or tubular 120. The resulting random impacts can produce a random, broadband acoustic signal that can be captured on the optical fiber 162 coupled (e.g., strapped) to the tubular 120. The random excitation response tends to have a broadband acoustic signal with excitation frequencies extending up to the high frequency bands, for example, up to and beyond about 5 kHz depending on the size of the sand particles 202. In general, larger particle sizes may produce higher frequencies. The intensity of the acoustic signal may be proportional to the concentration of sand 202 generating the excitations such that an increased broad band power intensity can be expected at increasing sand 202 concentrations. In some embodiments, the resulting broadband acoustic signals that can be identified can include frequencies in the range of about 5 Hz to about 10 kHz, frequencies in the range of about 5 Hz to about 5 kHz or about 50 Hz to about 5 kHz, or frequencies in the range of about 500 Hz to about 5 kHz. Any frequency ranges between the lower frequencies values (e.g., 5 Hz, 50 Hz, 500 Hz, etc.) and the upper frequency values (e.g., 10 kHz, 7 kHz, 5 kHz, etc.) can be used to define the frequency range for a broadband acoustic signal.

In addition to the sand entering the wellbore, fluid inflow at the location can also create acoustic signals along with fluid flowing axially or longitudinally through the wellbore. Background noise can also be present. Other acoustic signal sources can include fluid flow with or without sand 202 through the formation 102, fluid flow with or without sand 202 through a gravel pack 122, fluid flow with or without sand 202 within or through the tubular 120 and/or sand screen 118, fluid flow with sand 202 within or through the tubular 120 and/or sand screen 118, fluid flow without sand 202 into the tubular 120 and/or sand screen 118, gas/liquid inflow, hydraulic fracturing, fluid leaks past restrictions (e.g., gas leaks, liquid leaks, etc.) mechanical instrumentation and geophysical acoustic noises and potential point reflection noise within the fiber caused by cracks in the fiber optic cable/conduit under investigation. The combined acoustic signal can then be detected by the acoustic monitoring system. In order to detect one or more of these events, the acoustic signal can be processed to determine one or more frequency domain features of the acoustic signal at a depth in the wellbore.

In order to determine the frequency domain features, an acoustic signal can be obtained using the acoustic monitoring system during operation of the wellbore. The resulting acoustic signal can be optionally pre-processed using a number of steps. Depending on the type of DAS system employed, the optical data may or may not be phase coherent and may be pre-processed to improve the signal quality (e.g., denoised for opto-electronic noise normalization/de-trending single point-reflection noise removal through the use of median filtering techniques or even through the use of spatial moving average computations with averaging windows set to the spatial resolution of the acquisition unit, etc.). The raw optical data from the acoustic sensor can be received, processed, and generated by the sensor to produce the acoustic signal.

In some embodiments, a processor or collection of processors (e.g., processor 168 in FIG. 1) may be utilized to perform the optional pre-processing steps described herein. In an embodiment, the noise detrended "acoustic variant" data can be subjected to an optional spatial filtering step following the other pre-processing steps, if present. A spatial sample point filter can be applied that uses a filter to obtain a portion of the acoustic signal corresponding to a desired depth or depth range in the wellbore. Since the time the light pulse sent into the optical fiber returns as backscattered light can correspond to the travel distance, and therefore depth in the wellbore, the acoustic data can be processed to obtain a sample indicative of the desired depth or depth range. This may allow a specific location within the wellbore to be isolated for further analysis. The pre-processing may also include removal of spurious back reflection type noises at specific depths through spatial median filtering or spatial averaging techniques. This is an optional step and helps focus primarily on an interval of interest in the wellbore. For example, the spatial filtering step can be used to focus on a producing interval where there is high likelihood of sand ingress, for example. The resulting data set produced through the conversion of the raw optical data can be referred to as the acoustic sample data.

The acoustic data, including the optionally pre-processed and/or filtered data, can be transformed from the time domain into the frequency domain using a transform. For example, a Fourier transform such as a Discrete Fourier transformations (DFT), a short time Fourier transform (STFT), or the like can be used to transform the acoustic data measured at each depth section along the fiber or a section thereof into a frequency domain representation of the signal. The resulting frequency domain representation of the data can then be used to provide the data from which the plurality of frequency domain features can be determined. Spectral feature extraction using the frequency domain features through time and space can be used to determine one or more frequency domain features.

The use of frequency domain features to identify inflow events and locations, inflow phase identification, and/or inflow quantities of one or more fluid phases can provide a number of advantages. First, the use of frequency domain features results in significant data reduction relative to the raw DAS data stream. Thus, a number of frequency domain features can be calculated and used to allow for event identification while the remaining data can be discarded or otherwise stored, and the remaining analysis can performed using the frequency domain features. Even when the raw DAS data is stored, the remaining processing power is significantly reduced through the use of the frequency domain features rather than the raw acoustic data itself. Further, the use of the frequency domain features can, with the appropriate selection of one or more of the frequency domain features, provide a concise, quantitative measure of the spectral character or acoustic signature of specific sounds pertinent to downhole fluid surveillance and other applications.

While a number of frequency domain features can be determined for the acoustic sample data, not every frequency domain feature may be used to identify inflow events and locations, inflow phase identification, and/or inflow quantities of one or more fluid phases. The frequency domain features represent specific properties or characteristics of the acoustic signals.

In some embodiments, combinations of frequency domain features can be used as the frequency domain features themselves, and the resulting combinations are considered to be part of the frequency domain features as described herein. In some embodiments, a plurality of frequency domain features can be transformed to create values that can be used to define various event signatures. This can include mathematical transformations including ratios, equations, rates of change, transforms (e.g., wavelets, Fourier transforms, other wave form transforms, etc.), other features derived from the feature set, and/or the like as well as the use of various equations that can define lines, surfaces, volumes, or multivariable envelopes. The transformation can use other measurements or values outside of the frequency domain features as part of the transformation. For example, time domain features, other acoustic features, and non-acoustic measurements can also be used. In this type of analysis, time can also be considered as a factor in addition to the frequency domain features themselves. As an example, a plurality of frequency domain features can be used to define a surface (e.g., a plane, a three-dimensional surface, etc.) in a multivariable space, and the measured frequency domain features can then be used to determine if the specific readings from an acoustic sample fall above or below the surface. The positioning of the readings relative to the surface can then be used to determine if the event is present or not at that location in that detected acoustic sample.

The frequency domain features can include any frequency domain features derived from the frequency domain representations of the acoustic data. Such frequency domain features can include, but are not limited to, the spectral centroid, the spectral spread, the spectral roll-off, the spectral skewness, the root mean square (RMS) band energy (or the normalized sub-band energies/band energy ratios), a loudness or total RMS energy, a spectral flatness, a spectral slope, a spectral kurtosis, a spectral flux, a spectral autocorrelation function, or a normalized variant thereof.

The spectral centroid denotes the "brightness" of the sound captured by the optical fiber (e.g., optical fiber 162 shown in FIG. 1) and indicates the center of gravity of the frequency spectrum in the acoustic sample. The spectral centroid can be calculated as the weighted mean of the frequencies present in the signal, where the magnitudes of the frequencies present can be used as their weights in some embodiments.

The spectral spread is a measure of the shape of the spectrum and helps measure how the spectrum is distributed around the spectral centroid. In order to compute the spectral spread, Si, one has to take the deviation of the spectrum from the computed centroid as per the following equation (all other terms defined above):

$$S_t = \sqrt{\frac{\sum_{t=1}^{x}(f(k)-c_t)^x x_t(k)}{\sum_{t=1}^{x} x_t(k)}}. \quad \text{(Eq. 2)}$$

The spectral roll-off is a measure of the bandwidth of the audio signal. The Spectral roll-off of the $i^{th}$ frame, is defined as the frequency bin 'y' below which the accumulated magnitudes of the short-time Fourier transform reach a certain percentage value (usually between 85%-95%) of the overall sum of magnitudes of the spectrum.

$$\sum_{k=1}^{y} |X_t(k)| = \frac{c}{100} \sum_{k=1}^{N} |X_t(k)|, \quad \text{(Eq. 3)}$$

where c=85 or 95. The result of the spectral roll-off calculation is a bin index and enables distinguishing acoustic events based on dominant energy contributions in the frequency domain (e.g., between gas influx and liquid flow, etc.).

The spectral skewness measures the symmetry of the distribution of the spectral magnitude values around their arithmetic mean.

The RMS band energy provides a measure of the signal energy within defined frequency bins that may then be used for signal amplitude population. The selection of the bandwidths can be based on the characteristics of the captured acoustic signal. In some embodiments, a sub-band energy ratio representing the ratio of the upper frequency in the selected band to the lower frequency in the selected band can range between about 1.5:1 to about 3:1. In some embodiments, the sub-band energy ratio can range from about 2.5:1 to about 1.8:1, or alternatively be about 2:1 The total RMS energy of the acoustic waveform calculated in the time domain can indicate the loudness of the acoustic signal. In some embodiments, the total RMS energy can also be extracted from the temporal domain after filtering the signal for noise.

The spectral flatness is a measure of the noisiness/tonality of an acoustic spectrum. It can be computed by the ratio of the geometric mean to the arithmetic mean of the energy spectrum value and may be used as an alternative approach to detect broad-banded signals. For tonal signals, the spectral flatness can be close to 0 and for broader band signals it can be closer to 1.

The spectral slope provides a basic approximation of the spectrum shape by a linearly regressed line. The spectral slope represents the decrease of the spectral amplitudes from low to high frequencies (e.g., a spectral tilt). The slope, the y-intersection, and the max and media regression error may be used as features.

The spectral kurtosis provides a measure of the flatness of a distribution around the mean value.

The spectral flux is a measure of instantaneous changes in the magnitude of a spectrum. It provides a measure of the frame-to-frame squared difference of the spectral magnitude vector summed across all frequencies or a selected portion of the spectrum. Signals with slowly varying (or nearly constant) spectral properties (e.g., noise) have a low spectral flux, while signals with abrupt spectral changes have a high spectral flux. The spectral flux can allow for a direct measure of the local spectral rate of change and consequently serves as an event detection scheme that could be used to pick up the onset of acoustic events that may then be further analyzed using the feature set above to identify and uniquely classify the acoustic signal.

The spectral autocorrelation function provides a method in which the signal is shifted, and for each signal shift (lag) the correlation or the resemblance of the shifted signal with the original one is computed. This enables computation of the fundamental period by choosing the lag, for which the signal best resembles itself, for example, where the autocorrelation is maximized. This can be useful in exploratory signature analysis/even for anomaly detection for well integrity monitoring across specific depths where well barrier elements are positioned.

Any of these frequency domain features, or any combination of these frequency domain features (including transformations of any of the frequency domain features and combinations thereof), can be used to detect inflow events and locations, inflow phase identification, and/or inflow quantities of one or more phases within the wellbore. In an embodiment, a selected set of characteristics can be used to identify the presence or absence for each event, and/or all of the frequency domain features that are calculated can be used as a group in characterizing the presence or absence of an event. The specific values for the frequency domain features that are calculated can vary depending on the specific attributes of the acoustic signal acquisition system, such that the absolute value of each frequency domain feature can change between systems. In some embodiments, the frequency domain features can be calculated for each event based on the system being used to capture the acoustic signal and/or the differences between systems can be taken into account in determining the frequency domain feature values for each fluid inflow event between or among the systems used to determine the values and the systems used to capture the acoustic signal being evaluated.

One or a plurality of frequency domain features can be used to identify inflow events and locations, inflow phase identification, and/or inflow quantities of one or more phases. In some embodiments, one or a plurality of frequency domain features can also be used to detect inflow events and locations, inflow phase identification, and/or inflow quantities of one or more phases. In an embodiment, one, or at least two, three, four, five, six, seven, eight, etc. different frequency domain features can be used to detect inflow events and locations, inflow phase identification, and/or inflow quantities of one or more phases. The frequency domain features can be combined or transformed in order to define the event signatures for one or more events, such as, for instance, a fluid inflow event location or flowrate. While exemplary numerical ranges are provided herein, the actual numerical results may vary depending on the data acquisition system and/or the values can be normalized or otherwise processed to provide different results.

Figure 4:
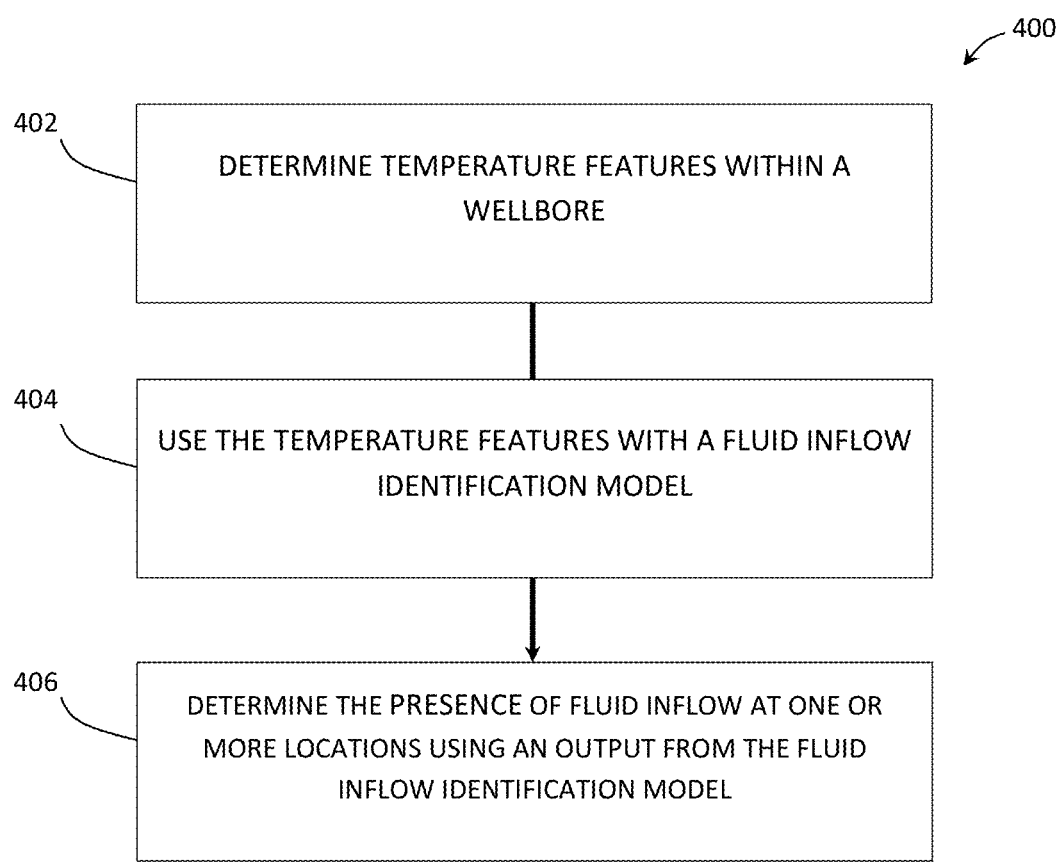
FIG. 4 is a flow chart of a method for determining fluid inflow locations within a wellbore according to some embodiments.

The systems described herein can be used with the temperature features and/or frequency domain features to determine the presence of fluid inflow at one or more locations along the wellbore. FIG. 4 illustrates a method 400 for determining fluid inflow locations. The method can start at step 402 with a determination of temperature features originating within the wellbore. As described herein, one or more fluids that can include gas, a liquid aqueous phase, a liquid hydrocarbon phase, and potentially other fluids as well as various combinations thereof can enter the wellbore at one or more locations along the wellbore. The temperature features can then be used to identify these inflow locations.

The temperature features can be determined using the temperature monitoring system to obtain temperature measurements along the length of the wellbore. In some embodiments, a DTS system can be used to receive distributed temperature measurement signals from a sensor disposed along the wellbore, such as an optical fiber. The resulting signals from the temperature monitoring system can be used to determine one or more temperature features as described herein. In some embodiments, a baseline or background temperature profile can be used to determine the temperature features, and the baseline temperature profile can be obtained prior to obtaining the temperature measurements.

In some embodiments, a plurality of temperature features can be determined from the temperature measurements, and the plurality of temperature features can comprise at least two of: a depth derivative of temperature with respect to depth, a temperature excursion measurement, a baseline temperature excursion, or a peak-to-peak value. Other temperature features can also be used in some embodiments. The temperature excursion measurement can comprise a difference between a temperature reading at a first depth, and a smoothed temperature reading over a depth range, where the first depth is within the depth range. The baseline temperature excursion can comprise a derivative of a baseline excursion with depth, where the baseline excursion can comprise a difference between a baseline temperature profile and a smoothed temperature profile. The peak-to-peak value can comprise a derivative of a peak-to-peak difference with depth, where the peak-to-peak difference comprises a difference between a peak high temperature reading and a peak low temperature reading within an interval.

Once the temperature features are obtained, the temperature features can be used with a fluid inflow identification model to identify the inflow locations. In some embodiments, the fluid inflow identification model can accept a plurality of temperature features as inputs. In general, the temperature features are representative of feature at a particular location (e.g., a depth resolution portion of the optical fiber along the wellbore) along the wellbore. The fluid inflow identification model can comprise one or more models configured to accept the temperature features as input(s) and provide an indication of whether or not there is a fluid inflow event at the particular location along the wellbore. The output of the fluid inflow identification model can be in the form of a binary yes/no result, and/or a likelihood of a fluid inflow event (e.g., a percentage likelihood, etc.). Other outputs providing an indication of a fluid inflow event are also possible. In some embodiments, the fluid inflow identification model can comprise a multivariate model, a machine learning model using supervised or unsupervised learning algorithms, or the like.

In some embodiments, the fluid inflow identification model can comprise a multivariate model. A multivariate model allows for the use of a plurality of variables in a model to determine or predict an outcome. A multivariate model can be developed using known data on fluid inflow events along with temperature features for those events to develop a relationship between the temperature features and the presence of fluid inflow at the locations within the available data. One or more multivariate models can be developed using data, where each multivariate model uses a plurality of temperature features as inputs to determine the likelihood of a fluid inflow event occurring at the particular location along the wellbore.

In some embodiments, the fluid inflow identification model can comprise one or more multivariate models. The multivariate model can use multivariate equations, and the multivariate model equations can use the temperature features or combinations or transformations thereof to determine when a fluid inflow event is present. The multivariate model can define a threshold, decision point, and/or decision boundary having any type of shapes such as a point, line, surface, or envelope between the presence and absence of the specific fluid inflow event. In some embodiments, the multivariate model can be in the form of a polynomial, though other representations are also possible. The model can include coefficients that can be calibrated based on known fluid inflow event data. While there can be variability or uncertainty in the resulting values used in the model, the uncertainty can be taken into account in the output of the model. Once calibrated or tuned, the model can then be used with the corresponding temperature features to provide an output that is indicative of the occurrence of a fluid inflow event.

The multivariate model is not limited to two dimensions (e.g., two temperature features or two variables representing transformed values from two or more temperature features), and rather can have any number of variables or dimensions in defining the threshold between the presence or absence of the fluid inflow event. When used, the detected values can be used in the multivariate model, and the calculated value can be compared to the model values. The presence of the fluid inflow event can be indicated when the calculated value is on one side of the threshold and the absence of the fluid or flow regime can be indicated when the calculated value is on the other side of the threshold. In some embodiments, the output of the multivariate model can be based on a value from the model relative to a normal distribution for the model. Thus, the model can represent a distribution or envelope and the resulting temperature features can be used to define where the output of the model lies along the distribution at the location in the wellbore. Thus, each multivariate model can, in some embodiments, represent a specific determination between the presence or absence of a fluid inflow event at a specific location in the wellbore. Different multivariate models, and therefore thresholds, can be used for different fluid inflow events, and each multivariate model can rely on different temperature features or combinations or transformations of temperature features. Since the multivariate models define thresholds for the determination and/or identification of fluid inflow events, the multivariate models and fluid inflow identification model using such multivariate models can be considered to be temperature based event signatures for each type of fluid inflow event.

In some embodiments, the fluid inflow identification model can comprise a plurality of models. Each of the models can use one or more of the temperature features as inputs. The models can comprise any suitable model that can relate one or more temperature features to an occurrence of a fluid inflow event (e.g., a likelihood of the event, a binary yes/no output, etc.). The output of each model can then be combined to form a composite or combined output. The combined output can then be used to determine if a fluid inflow event has occurred, for example, by comparing the combined output with a threshold value (e.g., a fluid inflow threshold). The determination of the occurrence of a fluid inflow event can then be based on the comparison of the combined output with the threshold value.

As an example, the fluid inflow identification model can comprise a plurality of multivariate models, each using a plurality of temperature features as described above. The output of the multivariate models can include a percentage likelihood of the occurrence of a fluid inflow event at the particular location at which each model is applied. The resulting output values can then be used in a function such as a simple multiplication, a weighted average, a voting scheme, or the like to provide a combined output. The resulting output can then be compared to a threshold to determine if a fluid inflow event has occurred. For example, a combined output indicating that there is greater than a fifty percent likelihood of a fluid inflow event at the particular location can be taken as an indication that a fluid inflow event has occurred at the location of interest.

In some embodiments, the fluid inflow identification model can also comprise other types of models. In some embodiments, a machine learning approach comprises a logistic regression model. In some such embodiments, one or more temperature features can be used to determine if a fluid inflow event is present at one or more locations of interest. The machine learning approach can rely on a training data set that can be obtained from a test set-up or obtained based on actual temperature data from known fluid inflow events. The one or more temperature features in the training data set can then be used to train the fluid inflow identification model using machine learning, including any supervised or unsupervised learning approach. For example, the fluid flow model can be a neural network, a Bayesian network, a decision tree, a logistical regression model, a normalized logistical regression model, or the like. In some embodiments, the fluid inflow identification model can comprise a model developed using unsupervised learning techniques such a k-means clustering and the like.

In some embodiments, the model(s) can be developed and trained using a logistic regression model. As an example for training of a model used to determine the presence or absence of a fluid inflow event, the training of the model can begin with providing the one or more temperature features to the logistic regression model corresponding to one or more reference data sets in which fluid inflow events are present. Additional reference data sets can be provided in which fluid inflow events are not present. The one or more temperature features can be provided to the logistic regression model, and a first multivariate model can be determined using the one or more frequency domain features as inputs. The first multivariate model can define a relationship between a presence and an absence of the fluid inflow events in the one or more fluids.

Once the model is trained, the fluid inflow identification model can be used to determine the presence or absence of a fluid inflow event at one or more locations along the wellbore in step 406. The temperature features determined for each location along the wellbore can be used with the fluid inflow identification model. The output of the model can provide an indication of the presence of a fluid inflow event at each location for which the temperature features are obtained. When the output indicates that a fluid inflow event has occurred at a given location, an output can be generated indicating the presence of the fluid inflow event. The process can be repeated along the length of the wellbore to provide a fluid inflow profile, which can comprise an indication of the fluid inflow events at one or more locations along the wellbore.

In some embodiments, the fluid inflow event outputs from the fluid identification model can be presented as a profile along a wellbore on an output device. The outputs can be presented in the form of an inflow profile depicted along an axis with or without a well schematic. The inflow profile can then be used to visualize the fluid inflow locations, which can allow for various processes to be carried out. For example, the fluid inflow locations can be compared to the producing zones within a completion to understand where fluid is entering the wellbore. In some embodiments, fluid inflow can be detected at locations other than a producing zone, which may provide an indication that a remediation procedure is needed within the wellbore.

Also disclosed herein is a process for validating the fluid inflow locations from the fluid inflow identification model using the temperature features and/or determining a quantity of fluid (e.g., a liquid) entering the wellbore at the one or more fluid inflow locations identified by the fluid inflow identification model. The validating model can use one or more frequency domain features in one or more fluid inflow models to predict a quantity or flow rate of one or more fluids and/or fluid phases into the wellbore. For example, the model can be used to predict the inflow rates of one or more fluids including a gas, an aqueous liquid, a hydrocarbon liquid, or another fluid within the wellbore. In some embodiments, the model can be used to predict the inflow rate of a fluid phase such as a gas phase and/or a liquid phase (e.g., including a liquid aqueous phase and a hydrocarbon liquid phase).

In some embodiments, the frequency domain features can be used with a fluid inflow model to predict a fluid inflow rate, such as a liquid flowrate into the wellbore. The fluid inflow model can relate a fluid inflow rate of one or more phases (e.g., including a total liquid flow rate) to one or more frequency domain features. In some embodiments, the fluid inflow model can accept one or more frequency domain features as inputs. In general, the frequency domain features are representative of feature at a particular location (e.g., a depth resolution portion of the optical fiber along the wellbore) along the wellbore. The fluid inflow model can comprise one or more models configured to accept the frequency domain features as input(s) and provide an indication of a fluid inflow rate at the location. The output of the fluid inflow model can be in the form of a flow rate of one or more fluids and/or fluid phases. In some embodiments, the fluid inflow model can comprise a multivariate model, a machine learning model using supervised or unsupervised learning algorithms, or the like.

In some embodiments, a fluid inflow model can be developed using a machine learning approach. In some such embodiments, a single frequency domain feature (e.g., spectral flatness, RMS bin values, etc.) can be used to determine if fluid inflow is present at each location of interest. In some embodiments, the supervised learning approach can be used to determine a model of the inflow rate of one or more fluids and/or fluid phases, such as gas inflow rate, a hydrocarbon inflow rate, a water inflow rate, a total gas phase inflow rate, and/or a total liquid phase (e.g., a liquid aqueous phase and a liquid hydrocarbon phase) inflow rate.

In some embodiments, the inflow model can be trained using a labeled data set, which can be obtained using a test apparatus such as a test flow set-up and/or field data that is labeled using other instrumentation to identify the fluid inflow rates. Using testing data as an example, the method of developing the fluid inflow model can include determining one or more frequency domain features from the acoustic signal for at least a portion of the data from the plurality of fluid inflow tests. The one or more frequency domain features can be obtained across the portion of the conduit where fluid inflow occurs. The fluid inflow model can then be trained using the frequency domain features from the inflow tests. The training of the fluid flow model can use machine learning, including any supervised or unsupervised learning approach. For example, the fluid flow model can be a neural network, a Bayesian network, a decision tree, a logistical regression model, a normalized logistical regression model, k-means clustering or the like.

In some embodiments, the fluid inflow model can be developed and trained using a logistic regression model. As an example for training of a model used to determine the fluid inflow rate, the training of the fluid flow model can begin with providing one or more frequency domain features to the logistic regression model corresponding to one or more inflow tests where known fluid inflow rates of one or more fluids and/or one or more fluid phases have been measured. Similarly, one or more frequency domain features can be provided to the logistic regression model corresponding to one or more inflow tests where no fluid inflow is present. A first multivariate model can be determined using the one or more frequency domain features as inputs. The first multivariate model can define a relationship between a presence and an absence of the type of fluid inflow and/or fluid phase inflow.

In the fluid flow model, the multivariate model equations can use the frequency domain features or combinations or transformations thereof to determine when a specific fluid inflow rate or fluid inflow rate for a fluid phase is present. The multivariate model can define a threshold, decision point, and/or decision boundary having any type of shapes such as a point, line, surface, or envelope between the presence and absence of the specific fluid inflow rate or fluid inflow rate for a phase. In some embodiments, the multivariate model can be in the form of a polynomial, though other representations are also possible. When models such a neural networks are used, the thresholds can be based on node thresholds within the model. As noted herein, the multivariate model is not limited to two dimensions (e.g., two frequency domain features or two variables representing transformed values from two or more frequency domain features), and rather can have any number of variables or dimensions in defining the threshold between the presence or absence of the fluid inflow and the specific fluid inflow rates for one or more fluids and/or fluid phases. Different multivariate models can be used for inflow rate for each fluid type and/or fluid inflow phase, and each multivariate model can rely on different frequency domain features or combinations or transformations of frequency domain features.

Whether a test system or in-situ sensors are used to obtain data on the inflow rates (collectively referred to as "reference data"), one or more models can be developed for the determination of the inflow rates using the reference data. The model(s) can be developed by determining one or more frequency domain features from the acoustic signal for at least a portion of the reference data. The training of the model(s) can use machine learning, including any supervised or unsupervised learning approach. For example, one or more of the model(s) can be a neural network, a Bayesian network, a decision tree, a logistical regression model, a normalized logistical regression model, k-means clustering, or the like.

The one or more frequency domain features used in the inflow model can comprise any frequency domain features noted hereinabove as well as combinations and transformations thereof. For example, In some embodiments, the one or more frequency domain features comprise a spectral centroid, a spectral spread, a spectral roll-off, a spectral skewness, an RMS band energy, a total RMS energy, a spectral flatness, a spectral slope, a spectral kurtosis, a spectral flux, a spectral autocorrelation function, combinations and/or transformations thereof, or any normalized variant thereof. In some embodiments, the one or more frequency domain features comprise a normalized variant of the spectral spread (NVSS) and/or a normalized variant of the spectral centroid (NVSC).

The output of the inflow model can comprise a flow rate of one or more fluids and/or fluid phases. For example, the total liquid inflow rate at a location can be determined from the inflow model. The resulting output can be compared to the output of the fluid inflow identification model to allow the inflow location determination to be based both on the fluid inflow identification model using the temperature features and the inflow model using the frequency domain features. The final output can be a function of both the output from the fluid inflow identification model and the inflow model. In some embodiments, the outputs can be combined as a product, weighted product, ratio, or other mathematical combination. Other combinations can include voting schemes, thresholds, or the like to allow the outputs from both models to be combined. As an example, if the output from either model is zero, then the fluid inflow identification at the location would also indicate that there is no fluid inflow at the location. In this example, one model can indicate that fluid inflow is present, but the other model can indicate that no fluid inflow is present. The final result can indicate that no fluid inflow is present. When both models indicate that fluid inflow is present, the final combined output can provide a positive indication of fluid inflow at the location. It is noted that the output of the inflow model can provide a fluid inflow rate of one or more fluids and/or fluid phases. While this output is distinct from the output of the fluid inflow identification model, the two outputs can be combined to improve the accuracy of the fluid inflow location identification.

Also described herein are methods and systems for using the combined or hybrid approach to determining fluid inflow rates at the one or more locations at which fluid inflow is identified. In these embodiments, the outputs of the fluid inflow identification model and the fluid inflow model can be used together to help to determine an inflow rate of one or more fluids and/or fluid phases within the wellbore. In some embodiments, the outputs of the two models can be combined to form a final flow rate determination. In some embodiments, the fluid inflow identification model can be used to identify the one or more locations at which inflow is occurring, and the fluid inflow model can then be used to determine the inflow rates at the identified locations, which can occur without combining the outputs of the two models.

Figure 5:
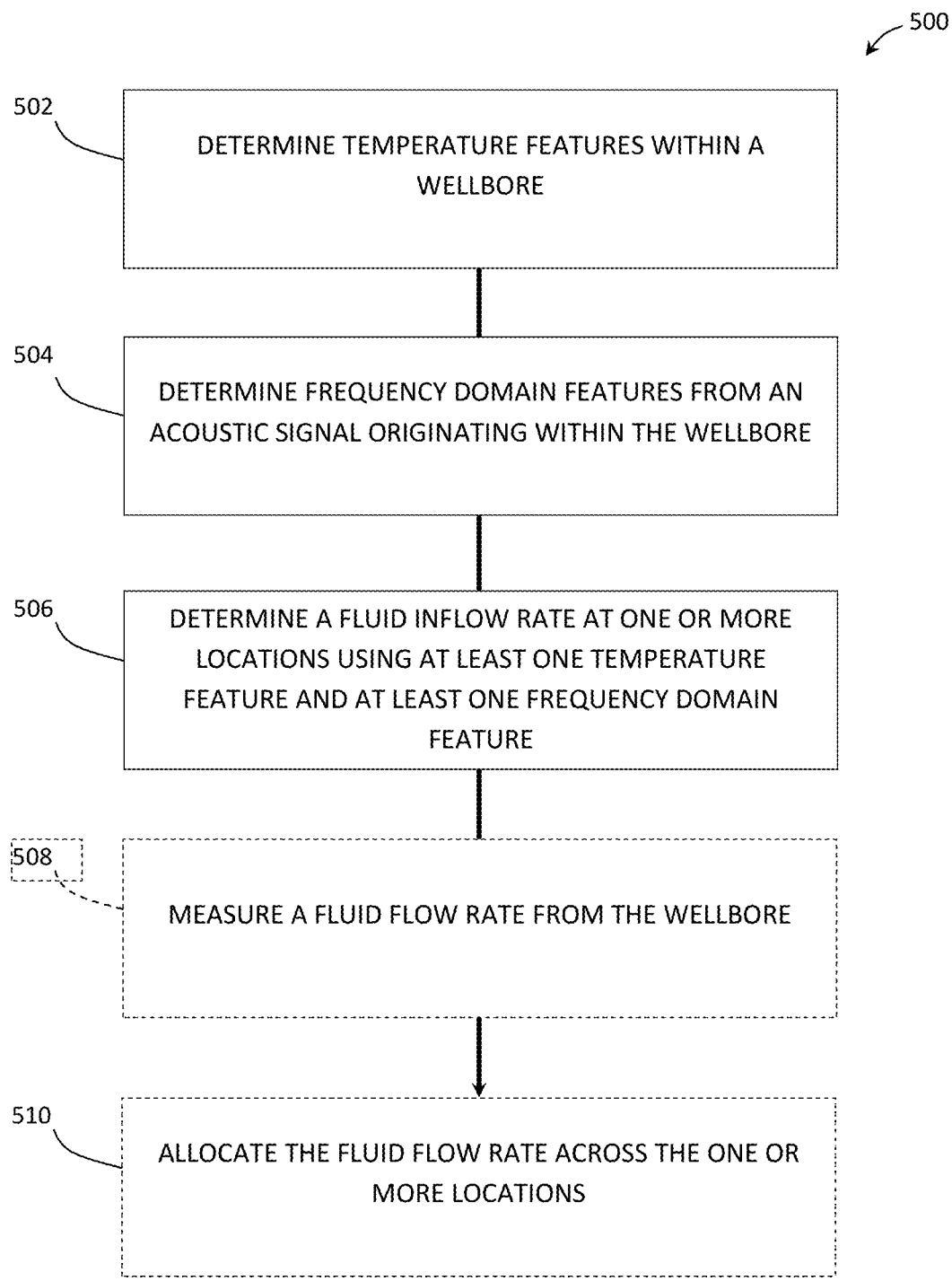
FIG. 5 is a flow diagram of a method of determining fluid inflow rates at one or more locations within a wellbore according to some embodiments.

FIG. 5 illustrates a flow chart for a method of determining fluid inflow rates within a wellbore 500. At step 502, the temperature features can be determined using any of the processes and systems as described herein. In some embodiments, a DTS system can be used to obtain distributed temperature sensing signal within the wellbore. The DTS system can provide distributed temperature measurements within the wellbore over time. A baseline temperature can be stored for the wellbore as described herein and used along with the temperature measurements to determine the temperature features. The temperature features can include any of those described herein including a depth derivative of temperature with respect to depth, a temperature excursion measurement, a baseline temperature excursion, a peak-to-peak value, a statistical measure of a variation with respect to time and/or distance, or a combination thereof.

At step 504, one or more frequency domain features can be obtained from an acoustic signal originating within the wellbore. The frequency domain features can be determined using any of the processes and systems as described herein. In some embodiments, a DAS system can be used to obtain a distributed acoustic signal within the wellbore. The acoustic signals obtained from the DAS system can then be processed to determine one or more frequency domain features as described herein. In some embodiments, the frequency domain features can comprise at least one of: a spectral centroid, a spectral spread, a spectral roll-off, a spectral skewness, an RMS band energy, a total RMS energy, a spectral flatness, a spectral slope, a spectral kurtosis, a spectral flux, a spectral autocorrelation function, or any combination thereof, including combinations and modifications thereof.

The temperature features and the frequency domain features can then be used to determine a fluid inflow rate at one or more locations along the wellbore in step 406. The temperature features and the frequency domain features can be used in several ways to obtain the inflow rates into the wellbore. In some embodiments, the temperature features can be used in the fluid inflow identification model to obtain an identification of one or more locations along the wellbore having fluid inflow. Any of the models and methods of using the temperature features within the models as described herein can be used in step 406 to determine the one or more inflow locations. The output of the fluid inflow identification model can provide an indication of one or more locations along the wellbore having a fluid inflow event.

The frequency domain features can be used in the fluid inflow model to obtain an indication of the inflow rate for one or more fluids and/or fluid phases along the wellbore. In some embodiments, the inflow model can be limited to being executed at the one or more locations identified by the fluid inflow identification model. The inflow model can then predict the fluid inflow rates of one or more fluids and/or fluid phases at the one or more locations. The fluid inflow rates can then be representative of the fluid inflow rates at the one or more locations along the wellbore.

In some embodiments, the output of the fluid inflow identification model and the fluid inflow model can be combined to provide a combined output from the fluid inflow identification model and the fluid inflow model. The resulting combined output can then be used to determine a fluid inflow rate at the one or more locations along the wellbore as identified by the fluid inflow identification model. The combined output can be determined as a function of the output of the fluid inflow identification model and the output of the fluid inflow model. Any suitable functions can be used to combine the outputs of the two models. This can include formulas, products, averages, and the like, each of which can comprise one or more constants or weightings to provide the final output. The ability to determine the fluid inflow rates as a function of the output of both models can allow for either model to override the output of the other model. For example, if the fluid inflow identification model indicates that a location along the wellbore has a fluid inflow event, but the fluid inflow model indicates little to no fluid inflow, the resulting combined output may be considered to indicate that there is no fluid inflow at that location. Similarly, if the fluid inflow identification model indicates a non-zero but low likelihood of fluid inflow at a location, the output can serve as a weighting to any fluid inflow rates determined by the fluid inflow model. Thus, the use of the hybrid model approach can provide two separate ways to verify and determine the fluid inflow rates into the wellbore.

The resulting output of the models can be an indication of fluid inflow at one or more locations along the wellbore. The fluid inflow prediction can be for one or more fluids (e.g., a gas, an aqueous liquid, a hydrocarbon liquid, etc.) and/or a fluid phase (e.g., a gas phase, a liquid phase, etc.). The fluid inflow rates can be used as indicated by the model in their form as output by the model. In some embodiments, the total fluid inflow rates can be normalized across the one or more locations having inflow. This can allow for a determination of a relative proportion of fluid flowing into the wellbore at each of the identified locations. This can be useful for understanding where the contributions to fluid flow are occurring along the wellbore, irrespective of the absolute flow rates within the wellbore.

In some embodiments, the fluid inflow rates can be refined by using a measure of the fluid flow rate from the wellbore as measured at logging tool above the producing zones, a wellhead, surface flow line, or the like. The fluid production rate can be measured by a standard fluid flowrate measurement tool that is not associated with the acoustic monitoring system or the temperature monitoring system within the wellbore. For example, the fluid production rate can be measured with various flow meters, The fluid production rate can comprise an indication of the fluid flow rates of one or more fluids and/or one or more fluid phases.

The resulting fluid production rate information can then be combined with the output of the combined models as described herein. In some embodiments, the resulting normalized fluid inflow rates can be used with the actual production rates to allocate the actual production rates across the one or more inflow locations within the wellbore. As an example, if the models indicate that thirty percent of a liquid phase inflow rate is occurring at a first location and seventy percent is occurring at a second location, the actual production rate can be allocated so that thirty percent of the produced liquid phase flowrate is attributed to the first location and the remaining seventy percent of the liquid phase flow rate is flowing into the wellbore at the second location. The allocations can be made for one or more of the fluid inflow rates and/or fluid phase inflow rates, where the actual production rates for the fluids and/or fluid phases can be used with the corresponding model outputs for one or more fluids and/or fluid phases. The allocation process can allow for an improved accuracy for the determination of fluid inflow rates at the one or more locations along the wellbore.

Figure 6:
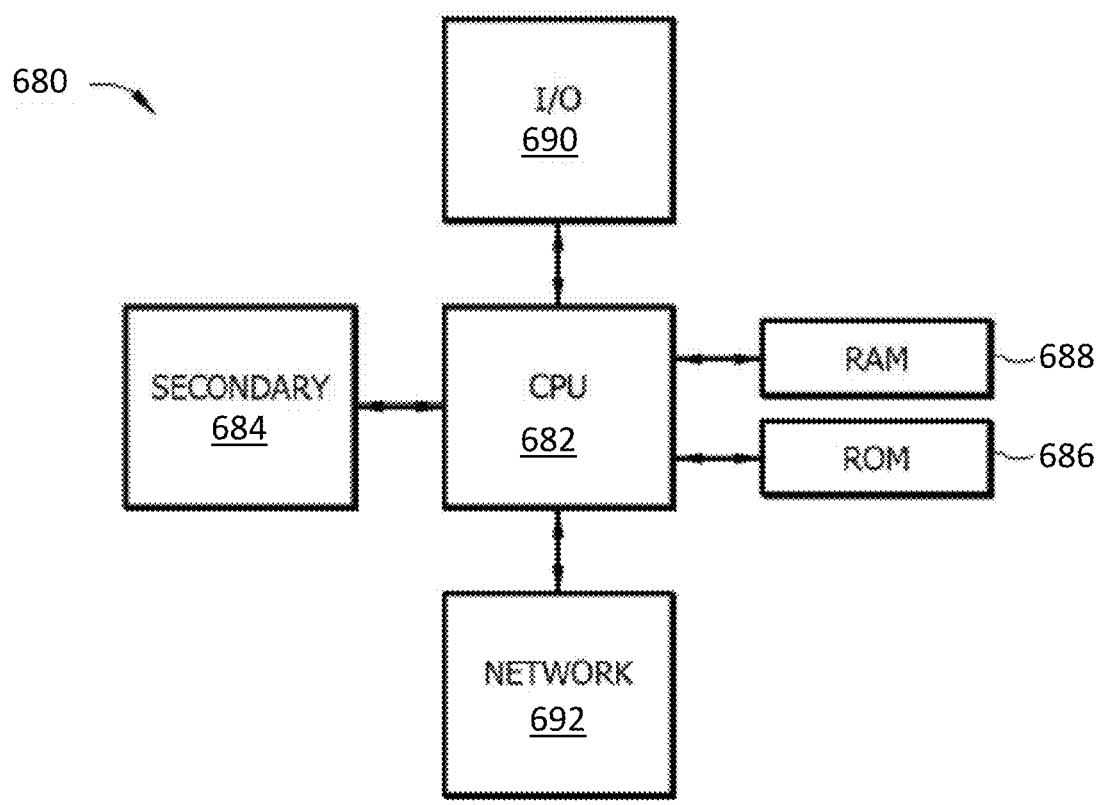
FIG. 6 schematically illustrates a computer that may be used to carry out various methods according to some embodiments.

Any of the systems and methods disclosed herein can be carried out on a computer or other device comprising a processor (e.g., a desktop computer, a laptop computer, a tablet, a server, a smartphone, or some combination thereof), such as the acquisition device 160 of FIG. 1. FIG. 6 illustrates a computer system 680 suitable for implementing one or more embodiments disclosed herein such as the acquisition device or any portion thereof. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 680 is turned on or booted, the CPU 682 may execute a computer program or application. For example, the CPU 682 may execute software or firmware stored in the ROM 686 or stored in the RAM 688. In some cases, on boot and/or when the application is initiated, the CPU 682 may copy the application or portions of the application from the secondary storage 684 to the RAM 688 or to memory space within the CPU 682 itself, and the CPU 682 may then execute instructions of which the application is comprised. In some cases, the CPU 682 may copy the application or portions of the application from memory accessed via the network connectivity devices 692 or via the I/O devices 690 to the RAM 688 or to memory space within the CPU 682, and the CPU 682 may then execute instructions of which the application is comprised. During execution, an application may load instructions into the CPU 682, for example load some of the instructions of the application into a cache of the CPU 682. In some contexts, an application that is executed may be said to configure the CPU 682 to do something, e.g., to configure the CPU 682 to perform the function or functions promoted by the subject application. When the CPU 682 is configured in this way by the application, the CPU 682 becomes a specific purpose computer or a specific purpose machine.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684. The secondary storage 684, the RAM 688, and/or the ROM 686 may be referred to in some contexts as computer readable storage media and/or non-transitory computer readable media.

I/O devices 690 may include printers, video monitors, electronic displays (e.g., liquid crystal displays (LCDs), plasma displays, organic light emitting diode displays (OLED), touch sensitive displays, etc.), keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 692 may enable the processor 682 to communicate with the Internet or one or more intranets. With such a network connection, it is contemplated that the processor 682 might receive information from the network, or might output information to the network (e.g., to an event database) in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several known methods. The baseband signal and/or signal embedded in the carrier wave may be referred to in some contexts as a transitory signal.

The processor 682 executes instructions, codes, computer programs, scripts which it accesses from hard disk, floppy disk, optical disk (these various disk based systems may all be considered secondary storage 684), flash drive, ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 684, for example, hard drives, floppy disks, optical disks, and/or other device, the ROM 686, and/or the RAM 688 may be referred to in some contexts as non-transitory instructions and/or non-transitory information.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data structures in part by directly accessing the computer program product, for example by reading from a CD-ROM disk inserted into a disk drive peripheral of the computer system 680. Alternatively, the processor 682 may process the executable instructions and/or data structures by remotely accessing the computer program product, for example by downloading the executable instructions and/or data structures from a remote server through the network connectivity devices 692. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

In some contexts, the secondary storage 684, the ROM 686, and the RAM 688 may be referred to as a non-transitory computer readable medium or a computer readable storage media. A dynamic RAM embodiment of the RAM 688, likewise, may be referred to as a non-transitory computer readable medium in that while the dynamic RAM receives electrical power and is operated in accordance with its design, for example during a period of time during which the computer system 680 is turned on and operational, the dynamic RAM stores information that is written to it. Similarly, the processor 682 may comprise an internal RAM, an internal ROM, a cache memory, and/or other internal non-transitory storage blocks, sections, or components that may be referred to in some contexts as non-transitory computer readable media or computer readable storage media.

Having described various systems and methods, certain embodiments can include, but are not limited to systems and methods for determining inflow locations and systems and methods for determining inflow rates. Certain embodiments for determining inflow locations can include, but are not limited to:

In a first embodiment, a method of determining fluid inflow locations comprises: determining a plurality of temperature features from a distributed temperature sensing signal originating in a wellbore; using the plurality of temperature features in a fluid inflow identification model; and determining the presence of fluid inflow at one or more locations along the wellbore based on an output from the fluid inflow identification model.

A second embodiment can include the method of the first embodiment, wherein the fluid inflow is a liquid inflow at the one or more locations.

A third embodiment can include the method of the second embodiment, wherein the liquid inflow comprises an aqueous liquid, a hydrocarbon liquid, or a combination of both.

A fourth embodiment can include the method of any one of the first to third embodiments, wherein the plurality of temperature features comprises a depth derivative of temperature with respect to depth.

A fifth embodiment can include the method of any one of the first to fourth embodiments, wherein the plurality of temperature features comprises a temperature excursion measurement, wherein the temperature excursion measurement comprises a difference between a temperature reading at a first depth and a smoothed temperature reading over a depth range, wherein the first depth is within the depth range.

A sixth embodiment can include the method of any one of the first to fifth embodiments, wherein the plurality of temperature features comprises a baseline temperature excursion, wherein the baseline temperature excursion comprises a derivative of a baseline excursion with depth, wherein the baseline excursion comprises a difference between a baseline temperature profile and a smoothed temperature profile.

A seventh embodiment can include the method of any one of the first to sixth embodiments, wherein the plurality of temperature features comprises a peak-to-peak value, wherein the peak-to-peak value comprises a derivative of a peak-to-peak difference with depth, wherein the peak-to-peak difference comprises a difference between a peak high temperature reading and a peak low temperature reading with an interval.

An eighth embodiment can include the method of any one of the first to seventh embodiments, wherein the fluid inflow identification model comprises a plurality of models, wherein each model of the plurality of model uses one or more temperature features of the plurality of temperature features, and wherein determining the presence of the fluid inflow comprises: combining an output from each model to determine combined output; comparing the combined output with a fluid inflow threshold; and determining that the combined output meets or exceeds the fluid inflow threshold, wherein the determination of the presence of the fluid inflow based on the determination that the combined output meets or exceeds the fluid inflow threshold.

A ninth embodiment can include the method of the eighth embodiment, wherein one or more of the plurality of models comprise multivariate models, and wherein the output from each multivariate model comprises an indication of a status of each temperature feature with respect to a multivariate normal distribution for the corresponding multivariate model.

A tenth embodiment can include the method of any one of the first to eighth embodiments, wherein the fluid inflow identification model uses an unsupervised learning algorithm.

An eleventh embodiment can include the method of any one of the first to eighth embodiments, wherein the fluid inflow identification model uses a supervised learning algorithm.

A twelfth embodiment can include the method of any one of the first to eleventh embodiments, further comprising: receiving the distributed temperature sensing signal from a sensor disposed in the wellbore, wherein the sensor comprises a fiber optic based distributed temperature sensor.

A thirteenth embodiment can include the method of any one of the first to twelfth embodiments, further comprising: determining one or more frequency domain features of an acoustic signal originating within the wellbore, wherein the acoustic signal and the distributed temperature sensing signal at least partially overlap in a position along the wellbore; wherein determining the presence of the fluid inflow uses the plurality of temperature features and at least one frequency domain feature of the one or more frequency domain features.

In a fourteenth embodiment, a method of determining fluid inflow locations comprises: determining a plurality of temperature features from a distributed temperature sensing signal originating in a wellbore, wherein the plurality of temperature features comprise at least two of: a depth derivative of temperature with respect to depth, a temperature excursion measurement, a baseline temperature excursion, or a peak-to-peak value; and determining the presence of fluid inflow at one or more locations along the wellbore using the plurality of temperature features.

A fifteenth embodiment can include the method of the fourteenth embodiment, wherein the fluid inflow is a liquid inflow at the one or more locations.

A sixteenth embodiment can include the method of the fifteenth embodiment, wherein the liquid inflow comprises an aqueous liquid, a hydrocarbon liquid, or a combination of both an aqueous liquid and a hydrocarbon liquid.

A seventeenth embodiment can include the method of any one of the fourteenth to sixteenth embodiments, wherein the temperature excursion measurement comprises a difference between a temperature reading at a first depth and a smoothed temperature reading over a depth range, wherein the first depth is within the depth range.

An eighteenth embodiment can include the method of any one of the fourteenth to seventeenth embodiments, wherein the baseline temperature excursion comprises a derivative of a baseline excursion with depth, wherein the baseline excursion comprises a difference between a baseline temperature profile and a smoothed temperature profile.

A nineteenth embodiment can include the method of any one of the fourteenth to eighteenth embodiments, wherein the peak-to-peak value comprises a derivative of a peak-to-peak difference with depth, wherein the peak-to-peak difference comprises a difference between a peak high temperature reading and a peak low temperature reading with an interval.

In a twentieth embodiment, a system of determining fluid inflow locations within a wellbore comprises: a processor; a memory; and an analysis program stored in the memory, wherein the analysis program is configured, when executed on the processor, to: receive a distributed temperature sensing signal, wherein the distributed temperature sensing signal originates within the wellbore; determine a plurality of temperature features from the distributed temperature sensing signal; use the plurality of temperature features in a fluid inflow identification model; and determine the presence of fluid inflow at one or more locations along the wellbore based on an output from the fluid inflow identification model.

A twenty first embodiment can include the system of the twentieth embodiment, wherein the fluid inflow is a liquid inflow at the one or more locations.

A twenty second embodiment can include the system of the twenty first embodiment, wherein the liquid inflow comprises an inflow rate for an aqueous liquid, a hydrocarbon liquid, or a combination of both.

A twenty third embodiment can include the system of any one of the twentieth to twenty second embodiments, wherein the plurality of temperature features comprises a depth derivative of temperature with respect to depth.

A twenty fourth embodiment can include the system of any one of the twentieth to twenty third embodiments, wherein the plurality of temperature features comprises a temperature excursion measurement, wherein the temperature excursion measurement comprises a difference between a temperature reading at a first depth and a smoothed temperature reading over a depth range, wherein the first depth is within the depth range.

A twenty fifth embodiment can include the system of any one of the twentieth to twenty fourth embodiments, wherein the plurality of temperature features comprises a baseline temperature excursion, wherein the baseline temperature excursion comprises a derivative of a baseline excursion with depth, wherein the baseline excursion comprises a difference between a baseline temperature profile and a smoothed temperature profile.

A twenty sixth embodiment can include the system of any one of the twentieth to twenty fifth embodiments, wherein the plurality of temperature features comprises a peak-to-peak value, wherein the peak-to-peak value comprises a derivative of a peak-to-peak difference with depth, wherein the peak-to-peak difference comprises a difference between a peak high temperature reading and a peak low temperature reading with an interval.

A twenty seventh embodiment can include the system of any one of the twentieth to twenty sixth embodiments, wherein the fluid inflow identification model comprises a plurality of models, wherein each model of the plurality of model uses one or more temperature features of the plurality of temperature features, and wherein the analysis program is further configured to: combine an output from each model to determine combined output; compare the combined output with a fluid inflow threshold; and determine that the combined output meets or exceeds the fluid inflow threshold, wherein the determination of the presence of the fluid inflow based on the determination that the combined output meets or exceeds the fluid inflow threshold.

A twenty eighth embodiment can include the system of the twenty seventh embodiment, wherein one or more of the plurality of models comprise multivariate models, and wherein the output from each multivariate model comprises an indication of a status of each temperature feature with respect to a multivariate normal distribution for the corresponding multivariate model.

A twenty ninth embodiment can include the system of any one of the twentieth to twenty seventh embodiments, wherein the fluid inflow identification model uses an unsupervised learning algorithm.

A thirtieth embodiment can include the system of any one of the twentieth to twenty seventh embodiments, wherein the fluid inflow identification model uses a supervised learning algorithm.

A thirty first embodiment can include the system of any one of the twentieth to thirtieth embodiments, wherein the analysis program is further configured to: receive the distributed temperature sensing signal from a sensor disposed in the wellbore, wherein the sensor comprises a fiber optic based distributed temperature sensor.

A thirty second embodiment can include the system of any one of the twentieth to thirty first embodiments, wherein the analysis program is further configured to: determine one or more frequency domain features of an acoustic signal originating within the wellbore, wherein the acoustic signal and the distributed temperature sensing signal at least partially overlap in a position along the wellbore; and determine the presence of the fluid inflow using the plurality of temperature features and at least one frequency domain feature of the one or more frequency domain features.

Certain embodiments for determining inflow rates can include, but are not limited to:

In a first embodiment, a method of determining fluid inflow rates within a wellbore comprises: determining a plurality of temperature features from a distributed temperature sensing signal originating in a wellbore; determining one or more frequency domain features from an acoustic signal originating the wellbore; and using at least one temperature feature of the plurality of temperature features and at least one frequency domain feature of the one or more frequency domain features to determine a fluid inflow rate at one or more locations along the wellbore.

A second embodiment can include the method of the first embodiment, wherein using the at least one temperature feature and the at least one frequency domain feature comprises: using the at least one temperature features in a first fluid inflow model; using at least one frequency domain feature of the one or more frequency domain features in a second fluid inflow model; combining an output from the first fluid inflow model and an output from the second fluid inflow model to form a combined output; and determining a fluid inflow rate at the one or more locations along the wellbore based on the combined output.

A third embodiment can include the method of the second embodiment, wherein the first fluid inflow model comprise one or more multivariate models, and wherein the output from each multivariate model of the one or more multivariate model comprises an indication of the one or more locations along the wellbore.

A fourth embodiment can include the method of the third embodiment, wherein the second fluid inflow model comprises a regression model, and wherein the output from the regression model comprises an indication of a fluid inflow rate at the one or more locations along the wellbore.

A fifth embodiment can include the method of the fourth embodiment, wherein combining the output from the first fluid model with the output from the second fluid inflow model comprises determining the combined output as a function of: 1) the output from the first fluid model, and 2) the output from the second fluid inflow model.

A sixth embodiment can include the method of any one of the first to fifth embodiments, further comprising: receiving an indication of a fluid flow rate from the wellbore; and allocating a portion of the fluid flow rate from the wellbore to the one or more locations along the wellbore based on the determined fluid inflow rate at the one or more locations based on the combined output.

A seventh embodiment can include the method of any one of the first to sixth embodiments, wherein the fluid inflow rate is the liquid inflow rate at one or more locations along the wellbore.

An eighth embodiment can include the method of any one of the first to seventh embodiments, wherein the plurality of temperature features comprise at least two of: a depth derivative of temperature with respect to depth, a temperature excursion measurement, a baseline temperature excursion, or a peak-to-peak value.

A ninth embodiment can include the method of any one of the first to eighth embodiments, wherein the temperature excursion measurement comprises a difference between a temperature reading at a first depth and a smoothed temperature reading over a depth range, wherein the first depth is within the depth range.

A tenth embodiment can include the method of any one of the first to ninth embodiments, wherein the baseline temperature excursion comprises a derivative of a baseline excursion with depth, wherein the baseline excursion comprises a difference between a baseline temperature profile and a smoothed temperature profile.

An eleventh embodiment can include the method of any one of the first to tenth embodiments, wherein the peak-to-peak value comprises a derivative of a peak-to-peak difference with depth, wherein the peak-to-peak difference comprises a difference between a peak high temperature reading and a peak low temperature reading with an interval.

A twelfth embodiment can include the method of any one of the first to eleventh embodiments, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

In a thirteenth embodiment, a method of determining fluid inflow rates along a wellbore comprises: determining a plurality of temperature features from a distributed temperature sensing signal originating in a wellbore, wherein the plurality of temperature features comprise at least two of: a depth derivative of temperature with respect to depth, a temperature excursion measurement, a baseline temperature excursion, or a peak-to-peak value; determining one or more frequency domain features from an acoustic signal originated in the wellbore; and using at least one temperature feature of the plurality of temperature features and at least one frequency domain feature of the one or more frequency domain features to determine a fluid inflow rate at one or more locations along the wellbore.

A fourteenth embodiment can include the method of the thirteenth embodiment, wherein the temperature excursion measurement comprises a difference between a temperature reading at a first depth and a smoothed temperature reading over a depth range, wherein the first depth is within the depth range.

A fifteenth embodiment can include the method of the thirteenth or fourteenth embodiment, wherein the baseline temperature excursion comprises a derivative of a baseline excursion with depth, wherein the baseline excursion comprises a difference between a baseline temperature profile and a smoothed temperature profile.

A sixteenth embodiment can include the method of any one of the thirteenth to fifteenth embodiments, wherein the peak-to-peak value comprises a derivative of a peak-to-peak difference with depth, wherein the peak-to-peak difference comprises a difference between a peak high temperature reading and a peak low temperature reading with an interval.

A seventeenth embodiment can include the method of any one of the thirteenth to sixteenth embodiments, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

An eighteenth embodiment can include the method of any one of the thirteenth to seventeenth embodiments, wherein using the at least one temperature feature and the at least one frequency domain feature comprises: using the at least one temperature features in a first fluid inflow model; using at least one frequency domain feature of the one or more frequency domain features in a second fluid inflow model; combining an output from the first fluid inflow model and an output from the second fluid inflow model to form a combined output; and determining a fluid inflow rate at the one or more locations along the wellbore based on the combined output.

A nineteenth embodiment can include the method of the eighteenth embodiment, wherein the first fluid inflow model comprise one or more multivariate models, and wherein the output from each multivariate model of the one or more multivariate model comprises an indication of the one or more locations along the wellbore.

A twentieth embodiment can include the method of the nineteenth embodiment, wherein the second fluid inflow model comprises a regression model, and wherein the output from the regression model comprises an indication of a fluid inflow rate at the one or more locations along the wellbore.

A twenty first embodiment can include the method of the twentieth embodiment, wherein combining the output from the first fluid model with the output from the second fluid inflow model comprises determining the combined output as a function of: 1) the output from the first fluid model, and 2) the output from the second fluid inflow model.

A twenty second embodiment can include the method of any one of the thirteenth to twenty first embodiments, further comprising: receiving an indication of a fluid flow rate from the wellbore; and allocating a portion of the fluid flow rate from the wellbore to the one or more locations along the wellbore based on the determined fluid inflow rate at the one or more locations based on the combined output.

In a twenty third embodiment, a system of determining fluid inflow rates within a wellbore comprises: a processor; a memory; and an analysis program stored in the memory, wherein the analysis program is configured, when executed on the processor, to: receive a distributed temperature sensing signal and an acoustic signal, wherein the temperature sensing signal and the acoustic signal originated within the wellbore; determine a plurality of temperature features from the distributed temperature sensing signal; determine one or more frequency domain features from the acoustics signal; and determine a fluid inflow rate at one or more locations along the wellbore using at least one temperature feature of the plurality of temperature features and at least one frequency domain feature of the one or more frequency domain features.

A twenty fourth embodiment can include the system of the twenty third embodiment, wherein the analysis program is further configured to: use the at least one temperature features in a first fluid inflow model; use at least one frequency domain feature of the one or more frequency domain features in a second fluid inflow model; combine an output from the first fluid inflow model and an output from the second fluid inflow model to form a combined output; and determine a fluid inflow rate at the one or more locations along the wellbore based on the combined output.

A twenty fifth embodiment can include the system of the twenty fourth embodiment, wherein the first fluid inflow model comprise one or more multivariate models, and wherein the output from each multivariate model of the one or more multivariate model comprises an indication of the one or more locations along the wellbore.

A twenty sixth embodiment can include the system of the twenty fifth embodiment, wherein the second fluid inflow model comprises a regression model, and wherein the output from the regression model comprises an indication of a fluid inflow rate at the one or more locations along the wellbore.

A twenty seventh embodiment can include the system of the twenty sixth embodiment, wherein the analysis program is further configured to: combine the output from the first fluid model with the output from the second fluid inflow model as a function of: 1) the output from the first fluid model, and 2) the output from the second fluid inflow model.

A twenty eighth embodiment can include the system of any one of the twenty third to twenty seventh embodiments, wherein the analysis program is further configured to: receive an indication of a fluid flow rate from the wellbore; and allocate a portion of the fluid flow rate from the wellbore to the one or more locations along the wellbore based on the determined fluid inflow rate at the one or more locations based on the combined output.

A twenty ninth embodiment can include the system of any one of the twenty third to twenty eighth embodiments, wherein the fluid inflow rate is the liquid inflow rate at one or more locations along the wellbore.

A thirtieth embodiment can include the system of any one of the twenty third to twenty ninth embodiments, wherein the plurality of temperature features comprise at least two of: a depth derivative of temperature with respect to depth, a temperature excursion measurement, a baseline temperature excursion, or a peak-to-peak value.

A thirty first embodiment can include the system of any one of the twenty third to thirtieth embodiments, wherein the temperature excursion measurement comprises a difference between a temperature reading at a first depth and a smoothed temperature reading over a depth range, wherein the first depth is within the depth range.

A thirty second embodiment can include the system of any one of the twenty third to thirty first embodiments, wherein the baseline temperature excursion comprises a derivative of a baseline excursion with depth, wherein the baseline excursion comprises a difference between a baseline temperature profile and a smoothed temperature profile.

A thirty third embodiment can include the system of any one of the twenty third to thirty second embodiments, wherein the peak-to-peak value comprises a derivative of a peak-to-peak difference with depth, wherein the peak-to-peak difference comprises a difference between a peak high temperature reading and a peak low temperature reading with an interval.

A thirty fourth embodiment can include the system of any one of the twenty third to thirty third embodiments, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

The embodiments disclosed herein have included systems and methods for detecting and/or characterizing sand ingress and/or sand transport within a subterranean wellbore, or a plurality of such wellbores. Thus, through use of the systems and methods described herein, one may more effectively limit or avoid sand ingress and accumulation with a wellbore so as to enhance the economic production therefrom.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

determine that the combined output meets or exceeds the fluid inflow threshold, wherein the determination of the presence of the fluid inflow based on the determination that the combined output meets or exceeds the fluid inflow threshold.

What is claimed is:

1. A method of determining fluid inflow locations, the method comprising:
    determining a plurality of temperature features from a distributed temperature sensing signal originating in a wellbore, wherein each temperature feature of the plurality of temperature features is a statistical variation of a temperature measurement in the wellbore through depth or a combination of time and depth;
    providing the plurality of temperature features as inputs to a fluid inflow identification model, wherein the fluid inflow identification model comprises a machine-learning model that is to provide an output indicative of a presence of fluid inflow based on the plurality of temperature features; and
    determining the presence of fluid inflow at one or more locations along the wellbore based on an output from the fluid inflow identification model.

2. The method of claim 1, wherein the fluid inflow is a liquid inflow at the one or more locations, and wherein the liquid inflow comprises an aqueous liquid, a hydrocarbon liquid, or a combination of both.

3. The method of claim 1, wherein the plurality of temperature features comprises a depth derivative of temperature with respect to depth.

4. The method of claim 1, wherein the plurality of temperature features comprises a temperature excursion measurement, wherein the temperature excursion measurement comprises a difference between a temperature reading at a first depth and a smoothed temperature reading over a depth range, wherein the first depth is within the depth range.

5. The method of claim 1, wherein the plurality of temperature features comprises a baseline temperature excursion, wherein the baseline temperature excursion comprises a derivative of a baseline excursion with depth, wherein the baseline excursion comprises a difference between a baseline temperature profile and a smoothed temperature profile.

6. The method of claim 1, wherein the plurality of temperature features comprises a peak-to-peak value, wherein the peak-to-peak value comprises a derivative of a peak-to-peak difference with depth, wherein the peak-to-peak difference comprises a difference between a peak high temperature reading and a peak low temperature reading with an interval.

7. The method of claim 1, wherein the fluid inflow identification model comprises a plurality of models, wherein each model of the plurality of models uses one or more temperature features of the plurality of temperature features, and wherein determining the presence of the fluid inflow comprises:
    combining an output from each model to determine combined output;
    comparing the combined output with a fluid inflow threshold; and
    determining that the combined output meets or exceeds the fluid inflow threshold, wherein the determination of the presence of the fluid inflow is based on the determination that the combined output meets or exceeds the fluid inflow threshold.

8. The method of claim 7, wherein one or more of the plurality of models comprise multivariate models, and wherein the output from each multivariate model comprises an indication of a status of each temperature feature with respect to a multivariate normal distribution for the multivariate model.

9. The method of claim 1, wherein the fluid inflow identification model uses at least one of: an unsupervised learning algorithm, or a supervised learning algorithm.

10. The method of claim 1, further comprising:
    receiving the distributed temperature sensing signal from a sensor disposed in the wellbore, wherein the sensor comprises a fiber optic based distributed temperature sensor.

11. The method of claim 1, further comprising:
    determining one or more frequency domain features of an acoustic signal originating within the wellbore, wherein the acoustic signal and the distributed temperature sensing signal at least partially overlap in a position along the wellbore;
    wherein determining the presence of the fluid inflow uses the plurality of temperature features and at least one frequency domain feature of the one or more frequency domain features.

12. A method of determining fluid inflow locations, the method comprising:
    determining a plurality of temperature features from a distributed temperature sensing signal originating in a wellbore, wherein the plurality of temperature features comprise at least two of: a depth derivative of temperature with respect to depth, a temperature excursion measurement, a baseline temperature excursion, or a peak-to-peak value; and
    determining a presence of fluid inflow at one or more locations along the wellbore using the plurality of temperature features as inputs to a machine-learning model that is configured to provide an output indicative of the presence of fluid inflow a the one or more locations.

13. The method of claim 12, wherein the fluid inflow is a liquid inflow at the one or more locations, and wherein the liquid inflow comprises an aqueous liquid, a hydrocarbon liquid, or a combination of both an aqueous liquid and a hydrocarbon liquid.

14. The method of claim 12, wherein the temperature excursion measurement comprises a difference between a temperature reading at a first depth and a smoothed temperature reading over a depth range, wherein the first depth is within the depth range.

15. The method of claim 12, wherein the baseline temperature excursion comprises a derivative of a baseline excursion with depth, wherein the baseline excursion comprises a difference between a baseline temperature profile and a smoothed temperature profile.

16. The method of claim 12, wherein the peak-to-peak value comprises a derivative of a peak-to-peak difference with depth, wherein the peak-to-peak difference comprises a difference between a peak high temperature reading and a peak low temperature reading with an interval.

17. A system of determining fluid inflow locations within a wellbore, the system comprising:
    a processor;
    a memory; and an analysis program stored in the memory, wherein the analysis program is configured, when executed on the processor, to:
- receive a distributed temperature sensing signal, wherein the distributed temperature sensing signal originates within the wellbore;
- determine a plurality of temperature features from the distributed temperature sensing signal, wherein each temperature feature of the plurality of temperature features is a statistical variation of a temperature measurement in the wellbore through depth or a combination of time and depth;
- provide the plurality of temperature features as inputs to a fluid inflow identification model, wherein the fluid inflow identification model comprises a machine-learning model that is to provide an output indicative of a presence of fluid inflow based on the plurality of temperature features; and
- determine the presence of fluid inflow at one or more locations along the wellbore based on an output from the fluid inflow identification model.

18. The system of claim 17, wherein the fluid inflow is a liquid inflow at the one or more locations, and wherein the liquid inflow comprises an inflow rate for an aqueous liquid, a hydrocarbon liquid, or a combination of both.

19. The system of claim 17, wherein the plurality of temperature features comprises at least one of: a depth derivative of temperature with respect to depth, a temperature excursion measurement, a baseline temperature excursion, or a peak-to-peak value.

20. The system of claim 17, wherein the fluid inflow identification model comprises a plurality of models, wherein each model of the plurality of model uses one or more temperature features of the plurality of temperature features, and wherein the analysis program is further configured to:
- combine an output from each model to determine combined output;
- compare the combined output with a fluid inflow threshold; and
- determine that the combined output meets or exceeds the fluid inflow threshold, wherein the determination of the presence of the fluid inflow is based on the determination that the combined output meets or exceeds the fluid inflow threshold.

21. The system of claim 20, wherein one or more of the plurality of models comprise multivariate models, and wherein the output from each multivariate model comprises an indication of a status of each temperature feature with respect to a multivariate normal distribution for the multivariate model.

22. The system of any one of claim 17, wherein the fluid inflow identification model uses at least one of: an unsupervised learning algorithm, or a supervised learning algorithm.

23. The system of claim 17, wherein the analysis program is further configured to:
- receive the distributed temperature sensing signal from a sensor disposed in the wellbore, wherein the sensor comprises a fiber optic based distributed temperature sensor.

24. The system of claim 17, wherein the analysis program is further configured to:
- determine one or more frequency domain features of an acoustic signal originating within the wellbore, wherein the acoustic signal and the distributed temperature sensing signal at least partially overlap in a position along the wellbore; and
- determine the presence of the fluid inflow using the plurality of temperature features and at least one frequency domain feature of the one or more frequency domain features.

* * * * *